(12) United States Patent     (10) Patent No.:    US 8,291,028 B2
Lasensky et al.                           (45) Date of Patent:   \*Oct. 16, 2012

(54) SYSTEMS AND METHODS FOR COMMUNICATING USING VOICE MESSAGES

(75) Inventors: Peter Joel Lasensky, San Diego, CA (US); Mark Everett Fehrenbach, San Diego, CA (US); Richard Edward Rohmann, San Diego, CA (US)

(73) Assignee: Pacific Datavision, Inc., San Diego, CA (US)

( \* ) Notice: Subject to any disclaimer, the term of this patent is extended or adjusted under 35 U.S.C. 154(b) by 23 days.

This patent is subject to a terminal disclaimer.

(21) Appl. No.: 12/636,645

(22) Filed: Dec. 11, 2009

(65) Prior Publication Data

US 2010/0144329 A1    Jun. 10, 2010

Related U.S. Application Data

(63) Continuation of application No. 10/659,936, filed on Sep. 10, 2003, now Pat. No. 7,653,691, which is a continuation-in-part of application No. 10/174,655, filed on Jun. 19, 2002, now Pat. No. 7,054,863, which is a continuation-in-part of application No. 09/859,245, filed on May 16, 2001, now abandoned, which is a continuation-in-part of application No. 09/713,487, filed on Nov. 15, 2000, now abandoned.

(51) Int. Cl.
*G06F 15/16* (2006.01)
(52) U.S. Cl. ........ 709/206; 709/203; 709/204; 709/205; 709/207; 379/93.01

(58) Field of Classification Search ............ 709/20–207, 709/219, 223–224; 715/728; 379/93.01
See application file for complete search history.

(56) References Cited

U.S. PATENT DOCUMENTS

| | | | |
|---|---|---|---|
| 5,003,576 | A | 3/1991 | Helferich |
| 5,105,197 | A | 4/1992 | Clagett |
| 5,179,627 | A | 1/1993 | Sweet et al. |
| 5,535,322 | A | 7/1996 | Hecht |

(Continued)

FOREIGN PATENT DOCUMENTS

JP          08172808      12/1997

(Continued)

OTHER PUBLICATIONS

International Search Report and Transmittal Notification for related application PCT/US01/43793, dated Apr. 3, 2002.

(Continued)

*Primary Examiner* — Thu Ha Nguyen
(74) *Attorney, Agent, or Firm* — Procopio, Cory, Hargreaves & Savitch LLP

(57) ABSTRACT

A communication system comprises a communication device configured to receive a data message, such as a text message, and to generate and send a voice reply to the data message using a simple transmit action. The data message comprises an identifier that can be used to determine a reply path related to the data message. Thus, when a user receives the data message, they can read the message initiate the simple transmit action, and reply to the data message by speaking an appropriate reply into the communication device. The spoken response is stored as a voice message and attached to a data message that is sent using the reply path identified by the identifier.

22 Claims, 22 Drawing Sheets

U.S. PATENT DOCUMENTS

| | | | |
|---|---|---|---|
| 5,630,205 A | 5/1997 | Ekelund | |
| 5,646,839 A | 7/1997 | Katz | |
| 5,659,742 A | 8/1997 | Beattie et al. | |
| 5,675,507 A | 10/1997 | Bobo, II | |
| 5,684,862 A | 11/1997 | Finnigan | |
| 5,737,532 A | 4/1998 | DeLair et al. | |
| 5,745,551 A | 4/1998 | Strauch et al. | |
| 5,796,727 A | 8/1998 | Harrison et al. | |
| 5,825,854 A | 10/1998 | Larson et al. | |
| 5,835,575 A | 11/1998 | Stoller et al. | |
| 5,862,325 A | 1/1999 | Reed et al. | |
| 5,867,821 A | 2/1999 | Ballantyne et al. | |
| 5,963,912 A | 10/1999 | Katz | |
| 5,977,913 A | 11/1999 | Christ | |
| 5,991,810 A * | 11/1999 | Shapiro et al. | 709/229 |
| 6,009,398 A | 12/1999 | Mueller et al. | |
| 6,021,410 A | 2/2000 | Choy | |
| 6,122,639 A | 9/2000 | Babu et al. | |
| 6,144,942 A | 11/2000 | Ruckdashel | |
| 6,167,395 A | 12/2000 | Beck et al. | |
| 6,175,822 B1 | 1/2001 | Jones | |
| 6,226,618 B1 | 5/2001 | Downs et al. | |
| 6,292,783 B1 | 9/2001 | Rohler et al. | |
| 6,298,326 B1 | 10/2001 | Feller | |
| 6,321,078 B1 | 11/2001 | Menelli et al. | |
| 6,345,288 B1 | 2/2002 | Reed et al. | |
| 6,405,215 B1 | 6/2002 | Yaung | |
| 6,421,009 B2 | 7/2002 | Suprunov | |
| 6,433,732 B1 | 8/2002 | Dutta et al. | |
| 6,442,250 B1 | 8/2002 | Troen-Krasnow et al. | |
| 6,442,604 B2 | 8/2002 | Romine | |
| 6,456,852 B2 | 9/2002 | Bar et al. | |
| 6,539,404 B1 | 3/2003 | Ouchi | |
| 6,564,071 B1 | 5/2003 | Bergins et al. | |
| 6,591,242 B1 | 7/2003 | Karp et al. | |
| 6,721,542 B1 | 4/2004 | Anttila et al. | |
| 6,782,414 B1 | 8/2004 | Xue et al. | |
| 6,801,932 B1 * | 10/2004 | Picoult et al. | 709/206 |
| 6,813,489 B1 * | 11/2004 | Wu et al. | 455/412.1 |
| 6,907,112 B1 * | 6/2005 | Guedalia et al. | 379/88.17 |
| 6,928,614 B1 * | 8/2005 | Everhart | 715/728 |
| 6,981,023 B1 * | 12/2005 | Hamilton et al. | 709/206 |
| 7,024,460 B2 * | 4/2006 | Koopmas et al. | 709/206 |
| 8,122,113 B2 * | 2/2012 | Harrington et al. | 709/222 |
| 2001/0048676 A1 * | 12/2001 | Jimenez et al. | 370/352 |
| 2001/0051990 A1 | 12/2001 | Shirakawa | |
| 2002/0057203 A1 | 5/2002 | Borders et al. | |
| 2002/0069063 A1 | 6/2002 | Buchner et al. | |
| 2002/0109706 A1 | 8/2002 | Lincke et al. | |
| 2002/0161801 A1 | 10/2002 | Hind et al. | |
| 2002/0194279 A1 * | 12/2002 | Chern | 709/206 |
| 2002/0194281 A1 | 12/2002 | McConnell et al. | |
| 2003/0204568 A1 | 10/2003 | Bhargava et al. | |
| 2004/0015548 A1 * | 1/2004 | Lee | 709/204 |
| 2004/0047303 A1 | 3/2004 | Fernandez et al. | |
| 2005/0038876 A1 * | 2/2005 | Chaudhuri | 709/219 |
| 2005/0176451 A1 | 8/2005 | Helferich | |
| 2005/0186945 A1 | 8/2005 | Mazor | |
| 2006/0031364 A1 * | 2/2006 | Hamilton et al. | 709/206 |
| 2006/0094455 A1 | 5/2006 | Hannu et al. | |
| 2006/0195540 A1 * | 8/2006 | Hamilton et al. | 709/206 |
| 2008/0196098 A1 * | 8/2008 | Cottrell et al. | 726/12 |

FOREIGN PATENT DOCUMENTS

| | | |
|---|---|---|
| WO | 0148986 A1 | 7/2001 |
| WO | 0172018 A2 | 9/2001 |
| WO | 0184815 A1 | 11/2001 |
| WO | 0241222 A1 | 5/2002 |
| WO | 2003096212 A | 11/2003 |

OTHER PUBLICATIONS

International Search Report for PCT/US04/29493 dated Sep. 29, 2005.
Database WPI Section EI, "Medical image database management system used in hospital controls additional connection of diagnostic image database to network during generation of diagnostic report file by scanning medical image displayed in medical image work station," Derwent Publications Ltd., London, GB, AN1998-106801, XP002192976 & JP 09330374 A (Hitachi Medical Corp.) Abstract, (Dec. 22, 1997).
Sawhney and Schmandt, "Nomadic Radio: Speech and Audio Interaction for Contextual Messaging in Nomadic Environments" Speech Interface Group, MIT Media Laboratory, ACM Transactions on Computer-Human Interaction, vol. 7, No. 3, Sep. 2000, pp. 353-383.
Supplementary European Search Report dated Jul. 21, 2010 in related EP Application No. 04783653.1 (3 pages).
Supplementary European Search Report for related EP Application No. 05800098.5 dated Nov. 4, 2010 (7 pages).
European Search Report issued in corresponding EP Patent Application No. 10191464.6 on Jan. 4, 2012, 7 pages.

* cited by examiner

SYSTEMS AND METHODS FOR COMMUNICATING USING VOICE MESSAGES

RELATED APPLICATION INFORMATION

This application claims priority under 35 U.S.C. §120 as a continuation of U.S. patent application Ser. No. 10/659,936 filed on Sep. 10, 2003, entitled "SYSTEMS AND METHODS FOR COMMUNICATING USING VOICE MESSAGES", which claims priority under 35 U.S.C. §120 as a continuation-in-part of U.S. patent application Ser. No. 10/174,655 filed Jun. 19, 2002, entitled "SYSTEM AND METHOD FOR ORIGINATING, STORING, PROCESSING AND DELIVERING MESSAGE DATA," which claims priority as a continuation-in-part of U.S. patent application Ser. No. 09/859,245 filed May 16, 2001, entitled "SYSTEM AND METHOD FOR CREATING A DIGITAL PROJECT LOG," which claims priority as a continuation-in-part of U.S. patent application Ser. No. 09/713,487 filed Nov. 15, 2000, entitled "SYSTEM AND METHOD FOR PROJECT LOG STORAGE AND RETRIEVAL," each of which is incorporated herein by reference in their entirety as if set fourth in full.

BACKGROUND

1. Technical Field

This invention relates broadly to the field of communications, and more particularly to a communication system and method for originating, storing, and delivering data.

2. Background Information

Communication systems are used in a wide variety of data storage and retrieval applications. Some of these applications include data log systems, wireless dictation, voice mail and messaging systems, and network storage applications. Communication systems employing networked communication devices have largely supplanted traditional hardcopy file systems and note-taking techniques. The shortcomings of these and other traditional techniques are well known: they are tedious, difficult to organize and comprehend, easily misplaced, and hard to secure.

However, some conventional communication systems have their own limitations. One example is the use of a recording device to memorialize an observation or event. The recording device may be a tape recorder or a video recorder, where the recording preserves a monitoring person's observations on a recording medium such as a cassette tape, microcassette, or videocassette. The recording medium can be lost or otherwise inaccessible. If it is accessible, it is usually accessible to only one user or otherwise limited to a small number of persons who must each maintain a copy. The copies are also difficult to reproduce and distribute effectively. Further, recordings are difficult to compile in a way that the recording media can be arranged in some logical, easily retrievable order.

Additional problems exist with conventional data storage or recording mechanisms for keeping records. One additional problem relates to control of the data. A voice mail system, for example, stores messages from a sender, but the sender relinquishes complete control of the messages to either a recipient or a third party over whom the sender has no control. Without adequate controls, data integrity and security can be lost.

Another additional problem is complexity. Again, using voice mail as an example, the sender must first dial a long telephone number, and then usually has to navigate to a storage location by keying in many more numbers or access codes. Each keystroke requires time and concentration, and as such diminishes the likelihood of successfully reaching a destination.

One further problem with conventional communication systems is the lack of ease with which data can be delivered once it has been received and stored. There are many techniques and platforms for communicating data; however, conventional techniques and platforms lack end-to-end security while still allowing automated delivery. Further, most systems are non-scalable, and cannot support a large number of users and/or recipients.

Limitations related to data storage and retrieval are not the only problems associated with conventional communication systems. For example, while conventional communication systems provide a plurality of methods for mobile users to stay connected, e.g., with work, home, clients, etc., these mechanisms can often be tedious, difficult and inefficient, which limits their usefulness. Often, a mobile user must attempt to "punch" in short messages on a small keyboard attached to their mobile communication device, or wade through hierarchical menus to generate or leave a message or contact a specific individual.

Because existing methods are so limiting, effective communication is difficult. Often messages sent leave out important information or are confusing. But even worse, existing methods are often not taken advantage of because of the difficulty in using them efficiently. Accordingly, mobile users are not effectively connected, which can reduce efficiency.

SUMMARY

A communication system comprises a communication device configured to receive a data message, such as a text message, and to generate and send a voice reply to the data message using a simple transmit action. The data message comprises an identifier that can be used to determine a reply path related to the data message. Thus, when a user receives the data message, they can read the message and initiate the simple transmit action, and reply to the data message by speaking an appropriate reply into the communication device. The spoken reply is stored as a voice message and attached to a data message that is sent using the reply path identified by the identifier.

According to one aspect, the communication device is configured to receive the spoken reply and store it as a voice message. The communication device can be configured to then generate a voice reply by attaching the stored voice message to a data message and then send the voice reply via the return path determined based on the identifier.

According to another aspect, the spoken reply can be transmitted to a message authority that can be configured to generate the voice reply by storing the voice reply as a voice message and attaching the stored voice message to a data message to generate a voice reply. The voice reply can then be sent via the return path determined based on the identifier.

These and other features, aspects, and embodiments of the inventions are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION

This invention provides a communication system and method for originating, processing storing and delivering data. In one embodiment, a user selects a recipient, presses a button, and speaks into the transmission device. When the user is done speaking, he releases the button. With no further action on the part of the sender, the message is transmitted to a server system. The server system stores the message as a digital file, determines the destination address of the intended recipient by reference to information previously stored in the server system, and sends the recipient a notification that enables the recipient to instantly retrieve a copy of the message. In another embodiment, the server sends a copy of the message directly to the recipient as an e-mail attachment.

In another exemplary embodiment, voice data is captured in real time by a transmission device such as the Nextel Direct Connect® cell phone. The voice data is transmitted as a voice message to a server system. The server system converts the voice message to a digital file, and time- and date-stamps the digital file. The digital file and associated information is then stored in a central database, and organized according to any user-specified organization scheme. One scheme could be a project log of files relating to observations about a project. Another scheme could be a billing and timekeeping system having comment and narrative files. Still yet another scheme includes one or more lists, such as to-do lists, punch lists, or patient records. The scheme could also include an organization of meeting minute files.

The digital file can then be accessed and delivered via the Internet. The contents of the digital file can also be e-mailed, electronically faxed, or played and transmitted over other voice or data networks. The server system automatically delivers a copy of the digital file to a recipient in several ways. The server system can send an e-mail notifying the recipient of the digital file with a link to a location from which the digital file may be accessed. Alternatively, the copy of the digital file can be attached to an e-mail sent to the recipient.

Figure 1:
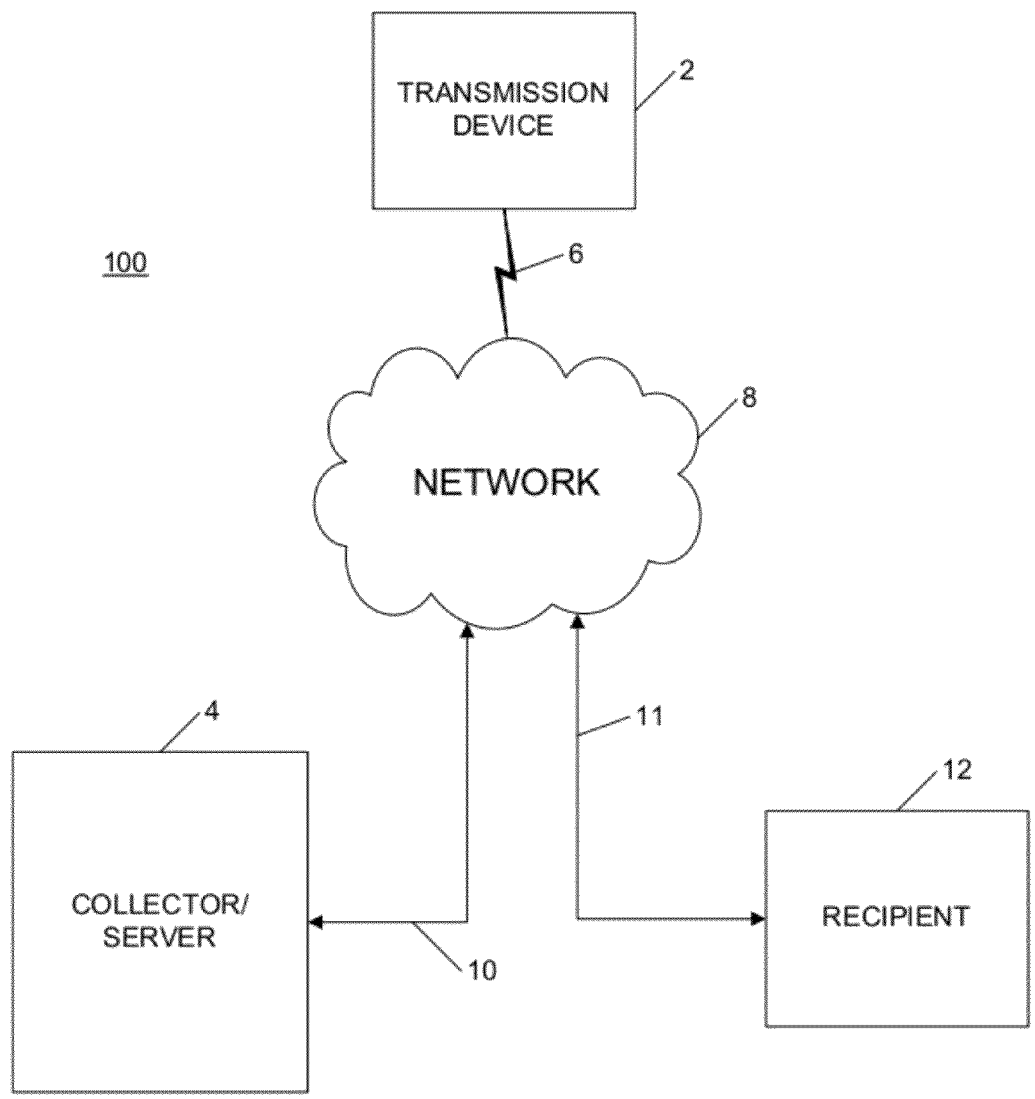
FIG. 1 is a simplified block diagram of a communication system according to an embodiment.

FIG. 1 is a simplified block diagram exemplifying a communication system 100 for originating, storing, managing, and delivering various forms of data. The communication system 100 includes at least one transmission device 2 communicating data with a collector/server 4 over a network 8 for subsequent access by a recipient 12. The recipient 12 can be a sender of the data, or one or more third parties identified by the sender. In one embodiment, the network 8 includes at least one wireless link 6, shown in FIG. 1 as between the transmission device 2 and "the network 8, but which may also be between network 8 and the collector/server 4. According to the embodiment, the wireless link 6 can be a part of a cellular or wireless network operating according to any voice and/or data communication standard. The network can include any variety of transmission media including, without limitation, fiber optic cable, twisted-pair wire, and coaxial cable. In another embodiment, the transmission device 2 is connected to the network 8 by a wired link (not shown).

The transmission device 2 includes any type of device capable of transmitting data, which includes voice or other audio content, text or other symbols, images or other graphics, and video content, or any combination thereof. Data includes messages as well as metadata appended to or transmitted separately from messages. A message is a collection of data formatted to anyone of a variety of message formats. Metadata includes identifiers (IDs), headers, addresses, footers, or other additional information related to the message or its transmission. In one embodiment, the transmission device 2 transmits messages formatted in the device's native protocol, such as the transmission control protocol (TCP) of the Internet protocol (IP) suite for Internet-enabled transmission devices.

Data is preferably transmitted as digital data, but can also be analog data converted to digital data at or before the collector/server 4. The transmission device 2 thus can be a telephone, personal digital assistant (PDA) or hybrid thereof, a computer (portable or desktop), one-way or two-way radio device, such as a pager, or any other known data transmission device. The transmission device 2 further may be integrated with other devices, such as a camera, camcorder, microphone, or voice recorder, for example. The transmission device 2 is preferably operated locally by a sender of the data, but it should be understood that the transmission device may be controlled remotely through a transmission device user interface. Although described as a device which sends data, the transmission device 102 may also receive data.

In one embodiment, the network 8 represents the Internet, to include any number of wired and wireless communication networks compliant with Internet-related protocols and standards. The network 8 may also represent a wide area network (WAN), local area network (LAN), or personal area network (PAN) connecting the transmission device 2 with the collector/server 4. The network 8 may even include a satellite communication network.

The collector/server 4 receives data, and maps metadata included with the data to one or more look-up tables to determine other information about the received data. The collector/server 4 then stores the data along with selected information related to the data. The collector/server 4 provides the recipient 12 access to the data based at least in part on reference to the selected related information stored with the data. The selected related information can include, in any combination, reference indicia such as the time, date, or duration of transmission or reception of the data, a project ID, an account identifier or identification (ID), intended recipient ID(s), sender ID and transmission device ID, data type, and storage entry ID, to name but a few examples. The collector/server 4 then serves a copy of the accessed data to the recipient via the network 8. The recipient 12 receives the copy of the accessed data using any device capable of communicating with the network 8 to receive the data, such as a computer, phone, PDA, etc.

Figure 2:
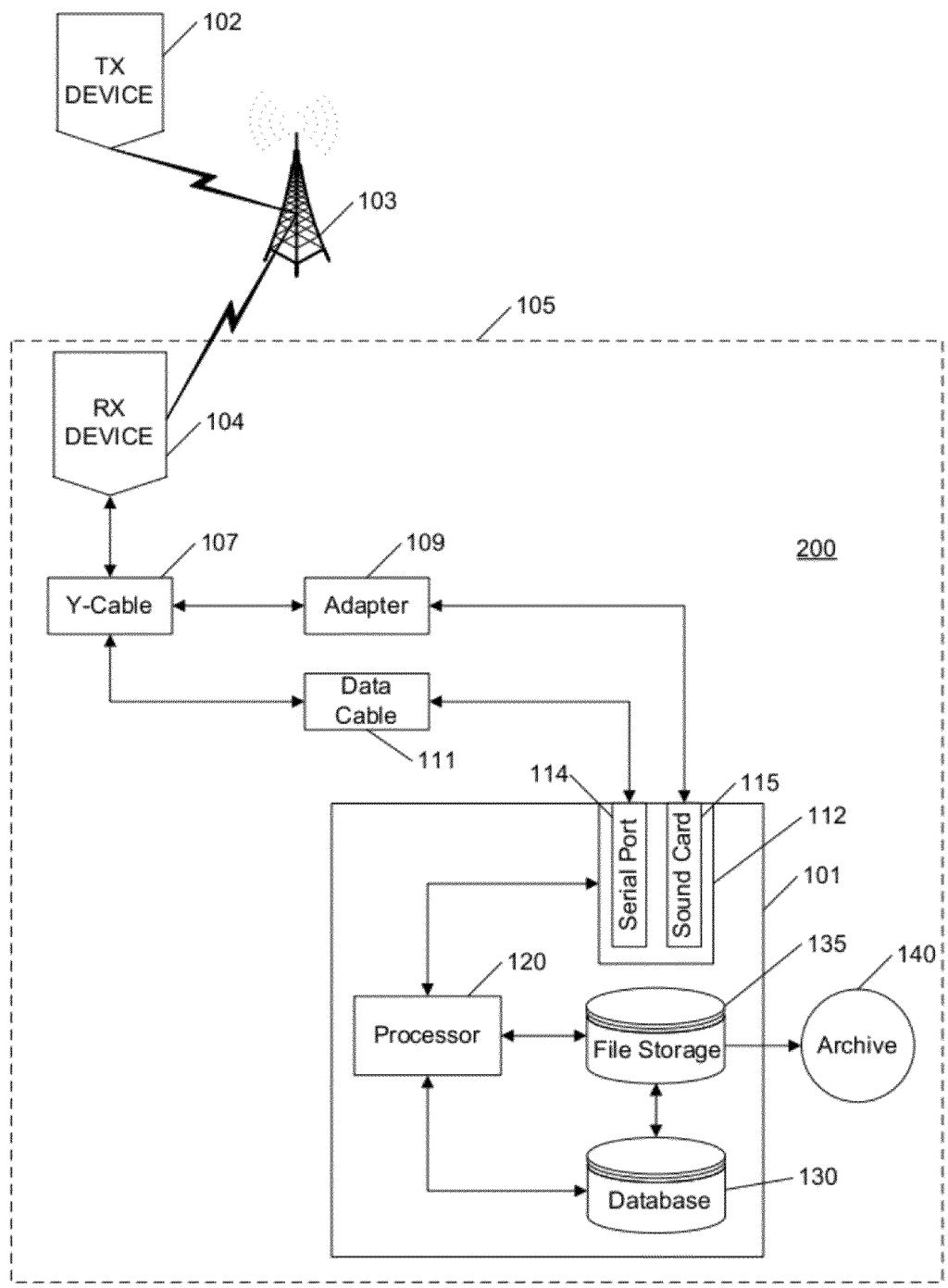
FIG. 2 shows a system for forming a project log, according to an embodiment.

FIG. 2 shows one specific embodiment of a communication system 200 according to the invention. In this embodiment, a transmission device 102 communicates with a collector/server 105 via a receive device 104 connected to a wireless network 103. The transmission device 102 can be a two-way cellular radio, such as a Direct Connect™ radio sold by Nextel Inc., or an IDEN™ phone sold by Motorola Inc. In the specific embodiment, the transmission device 102 uses the radio frequency spectrum to establish a direct radio link over the wireless network 103 to the receiving device 104, which can also be a two-way cellular radio.

The collector/server 105 includes a computer 101 that employs a communication interface 112. The communication interface 112 includes a serial port 114 and a sound card 115. The serial port 114 is connected to a data cable 111 to form a control channel for transmitting control signals and instructions between the receiving device 104 and the computer 101. The sound card 115 is connected to an adapter 109 to form a data channel, which is configured to receive data from the receiving device 104. A Y-cable 107 is used to connect both the control and data channels to the receiving device 104.

Alternatively, the receiver can comprise an "electronic gateway" interfaced, for example, with a wireless network 103. The electronic gateway can be configured to receive communications form the transmission device 102, via wireless network 103, and route them directly to one or more computers 101, e.g., via an IP network interface (not shown).

The transmission device 102 transmits data to the receive device 104 of the collector/server 105, which receives the data and passes it to the computer 101 via the data communication interface 112, as described above. A processor 120 in the computer 101 processes the data and parses from it metadata, i.e., information related to the data, such as an intended recipient or group of recipients, priority of the data, or a file address to which the data is stored. The processor 120 also formats the received data as a digital file, which preferably has a format that can be compressed and stored. In a particular embodiment, the processor 120 is a central processing unit (CPU) of the computer 101. In an alternative embodiment, the processor 120 includes a digital signal processor (DSP). The processor 120 may also be a distributed processing platform, distributed among two or more computers 101.

The data is stored in a storage 135. The metadata is also stored as tables in one or more records in a database 130. Data may also be archived in an archive 140 for long-term storage and retrieval of the digital files and/or associated database records. Those having skill in the art would recognize that functions of the storage 135, database 130, and archive 140 may be performed either by a single storage system or a distributed storage system. Such as storage system can include any type or number of storage media. The data stored in the storage 135 may be accessed via a network such as electronic mail and/or the Internet (not shown). In a particular embodiment, the storage 135 contents are persistent, secure, and copy-protected, so as to ensure their validity. Accordingly, once stored, the data is difficult or impossible to manipulate or otherwise change by a third party, who mayor may not have access to a copy of the data.

Figure 3:
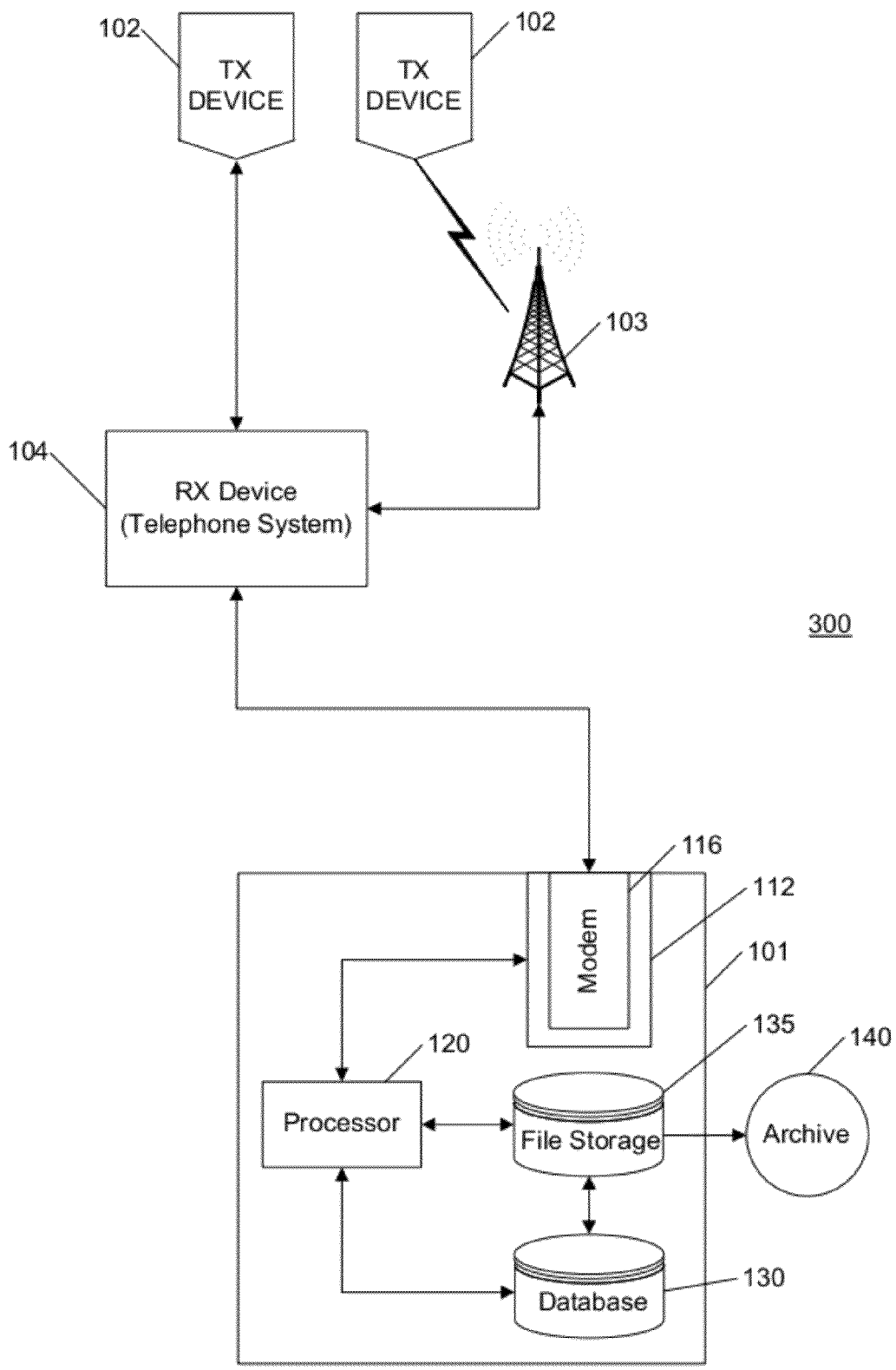
FIG. 3 illustrates another embodiment of a system for forming a project log.

FIG. 3 illustrates a communication system 300 for originating and collecting data according to an alternative embodiment of the invention. In the communication system 300, the data communication interface 112 to the computer 101 includes a modem 116 configured to communicate with a telephone system used as the receiving device 104. The telephone system can be a conventional plain-old telephone system (POTS) through which telephone signals are communicated via standard twisted-pair wire cable. In this embodiment, the transmitting device 102 can be either a wired telephone communicating over the POTS network, or a wireless telephone communicating with the POTS network through a wireless network 103.

Figure 4:
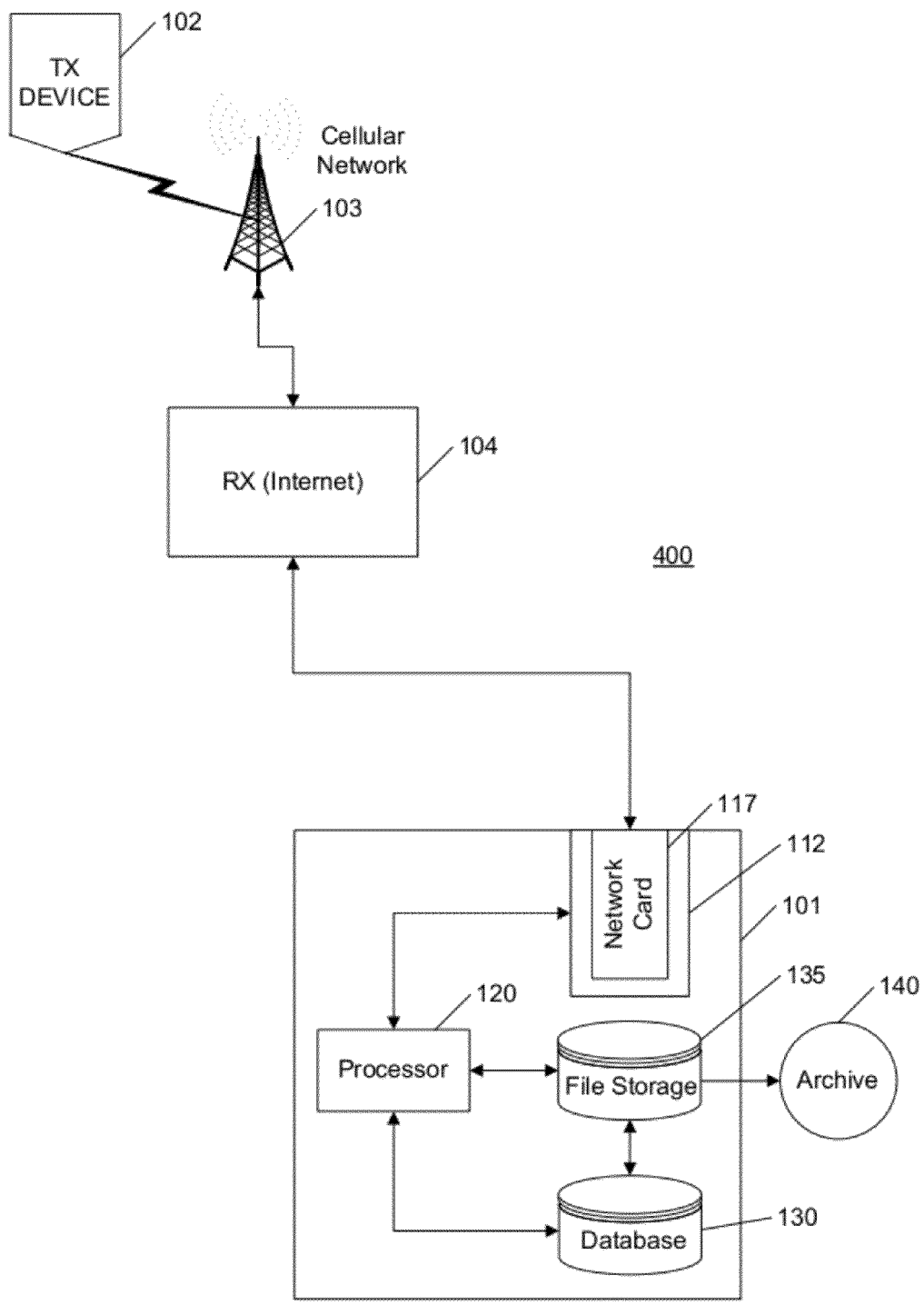
FIG. 4 shows yet another alternative embodiment of a system for forming a project log.

FIG. 4 shows yet another alternative embodiment of a communication system 400, which includes a computer 101 having a data communication interface 112 as substantially described above. The data communication interface 112 includes a network card 117 configured for communication with a data network, such as the Internet, a portion or node of which is used as the receiving device 104. The transmission device 102 communicates data as a form of Internet Protocol-compliant messages to the receiving device via cellular network 103.

Figure 5:
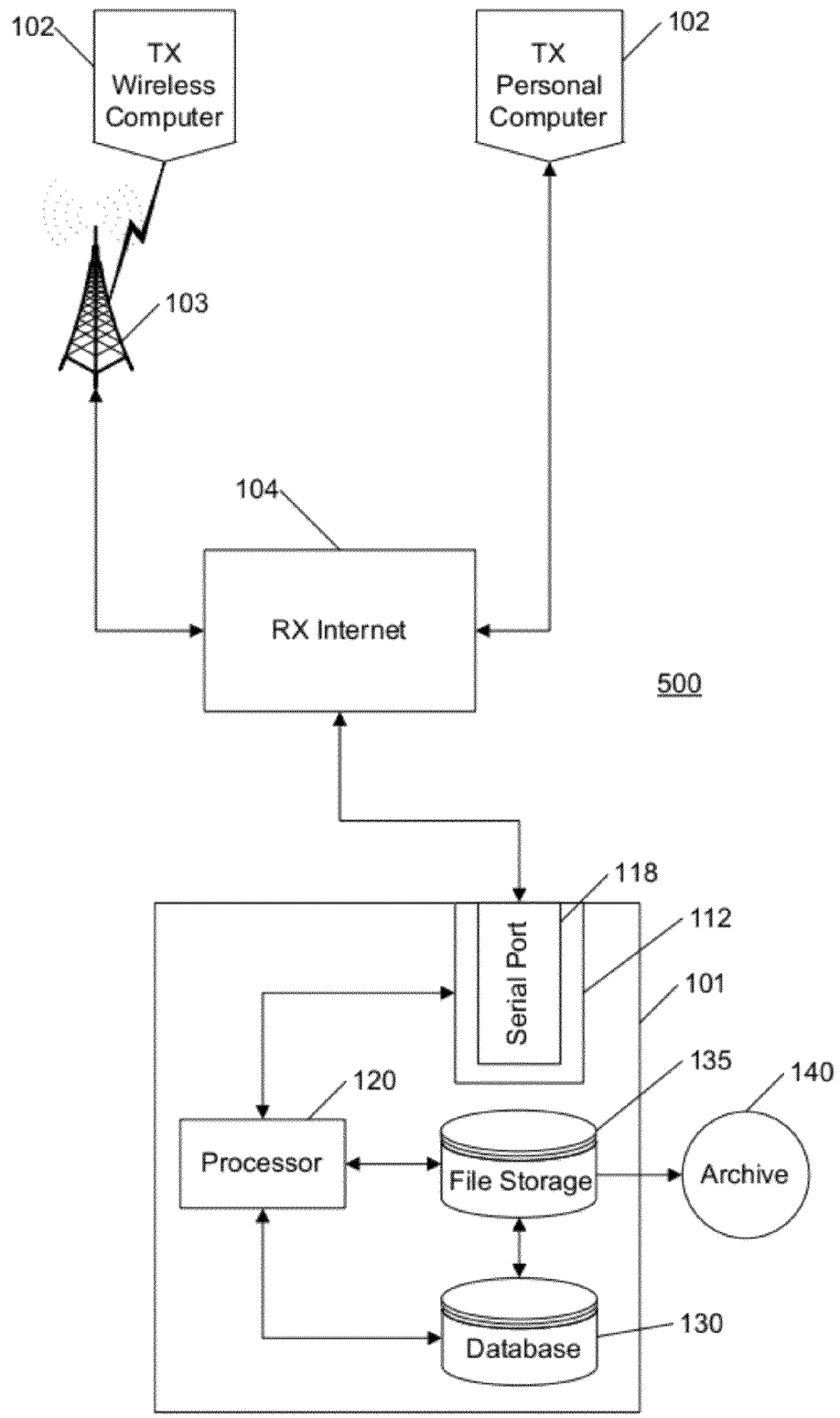
FIG. 5 shows yet another alternative embodiment of a system for forming a project log.

FIG. 5 shows yet another communication system 500 for originating and collecting data. The communication system 500 employs a data communication interface 112, which includes a network card 118 for communication with the network. At least a portion of the network acts as the receiving device 104. Suitable transmission devices 102 for the embodiment shown in the system 500 include a personal computer (PC), a wireless computer, such as a portable PC having wireless capabilities or a handheld personal digital assistant (PDA), connected to the receiving device 104 via a cellular network 103.

Figure 6:
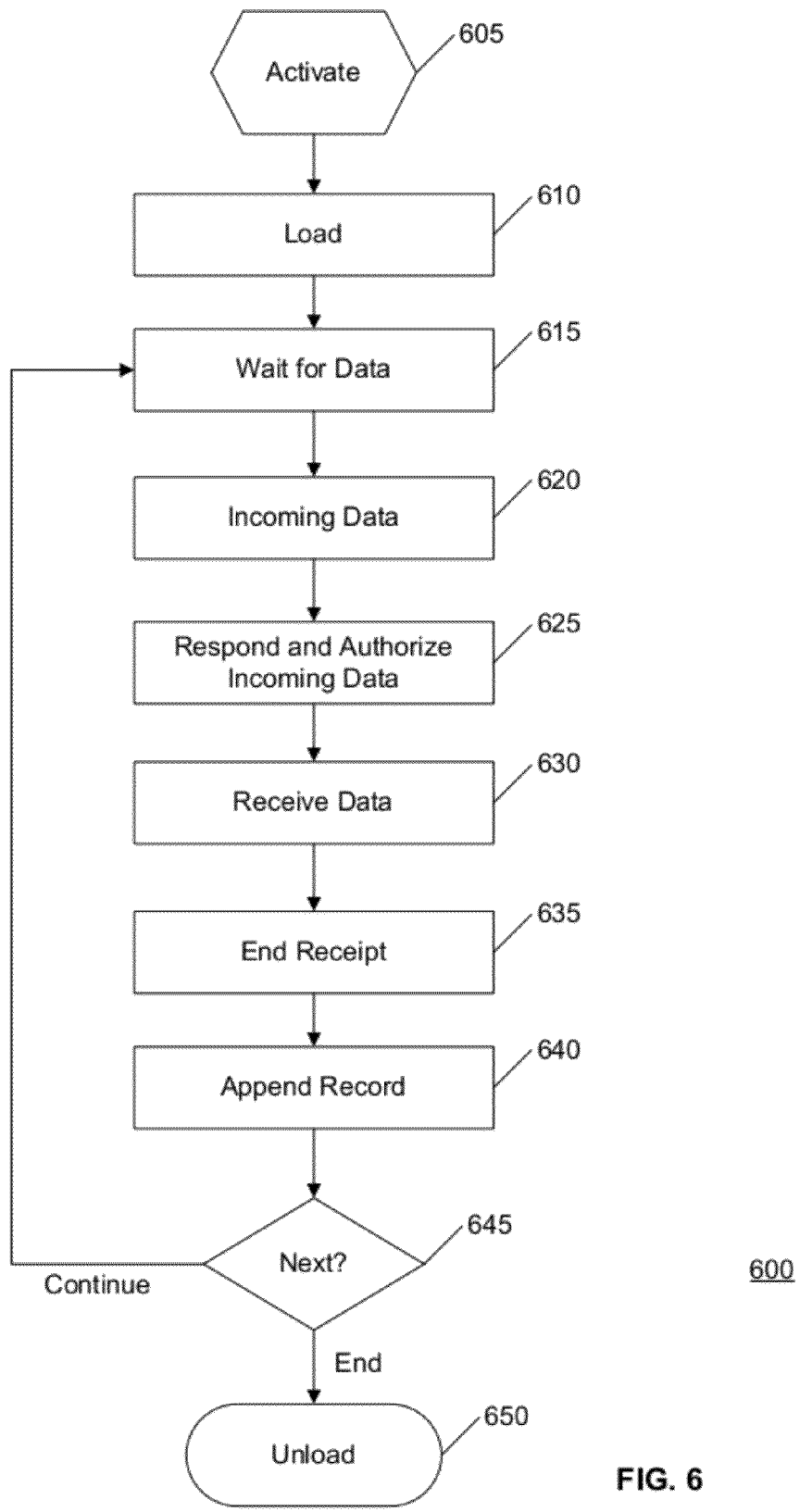
FIG. 6 illustrates one method of forming a project log according to the invention.

FIG. 6 illustrates one method 600 of originating, storing and delivering data. Method 600 begins at process block 605, in which global variables are initialized within software. The software commands the processor using the variables and controls the forming of a project log. The process block 605 further activates a process for receiving data. According to one method of the invention, at process block 610 a plurality of multimedia control objects (MMControl) are loaded, which set up a computer for communication with the transmission device through the receive device. Process block 610 is used to initialize an audio or video recording device through MMControl. In one specific embodiment, at process block 610 a bank of cellular telephones, having a two-way radio capability and acting as transmission and/or receive devices, are initialized and connected to enable direct messaging to the computer.

At process block 615 in the method 600, a wait period is executed to wait for data being transmitted and received. At process block 620, an authorization request is received as incoming data. In an embodiment, the authorization request includes a member identification number from one member of a group of mobile phone users. The identification number is looked up in a table that is part of a database of numbers. If the user is authorized to access the project log, then an authorization is given at process block 625. The identification number, along with the date and time of receipt of the authorization, is used to create a new record, including a filename, for the newly created record. In one embodiment, the filename will be appended to the data, and stored as a reference indication in the database.

Upon authorization, the communication link from the computer 101 to the relevant transmitting device 102 is in a state for carrying data. At process block 630, data representing an observation is received. As stated above, the data may be in any form, including digital or analog format. Examples of suitable analog data includes voice signals from a two-way radio, cellular phone, or conventional telephone. Digital data includes digital signals sent from a digital phone or a computer. According to one specific example, an observer speaks into a cellular radio that acts as a transmission device. The voice signals are transmitted to a second cellular radio that acts as a receive device.

The data is received until process block 635, when the transmission of data is stopped, and the receipt of data is accomplished. At block 635, the step of processing the received data is accomplished. For example, the voice signals from the receive device are received as an audio stream by a computer and processed into a sound clip, or other digital file. At block 635, all properties of the system are set in order to stop receiving and recording incoming data. The received data is set for being appended with metadata, and a duration of time in which the data was received is calculated.

At process block 640, various database routines are called to open the authorized database records and insert the data in a new or existing record. Metadata is also inserted. The record is then appended with reference indicia, which may include, but is not limited to, duration, sender identification, date, time, and filename. At step 645, a decision is made whether to execute an instruction to continue the process, or to end the method. If the process continues, the method returns to process block 615 to wait for more data. If no more data is to be received, an unload step is executed at process block 650 to deactivate incoming communication links and switch all communication devices to an inactive state.

Figure 7:
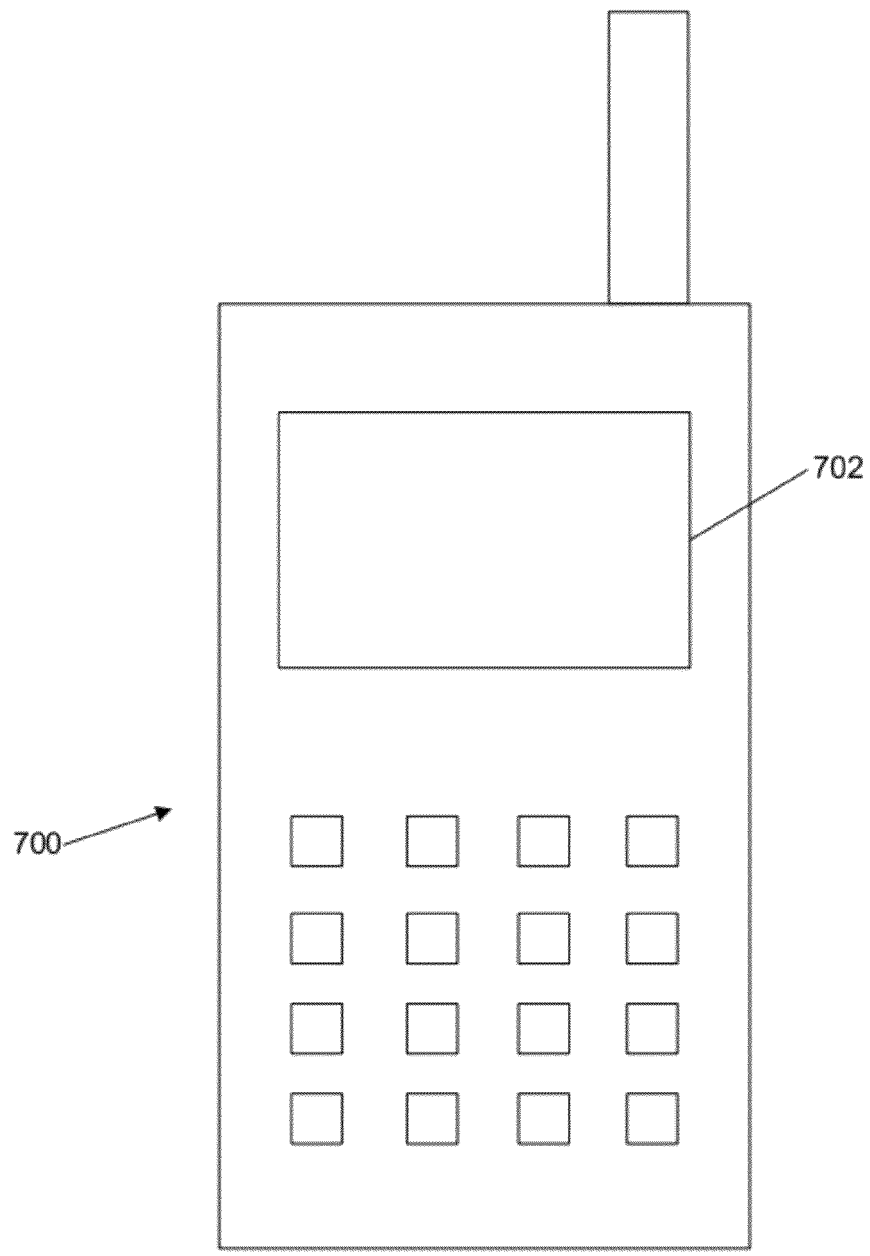
FIG. 7 shows one example of a transmission and/or receive device according to an embodiment of the invention.

Referring back to the general system shown in FIG. 1, and with reference to FIG. 7, there is shown a specific device 700 suitable for use as either a transmission device 2 or receive device 4. In one embodiment, the device 700 is a two-way hand-held communications device that operates in the short-wave frequency band, such as a walkie-talkie. Although the distance between a transmission device 2 and receive device 4 is limited with a walkie-talkie short-wave radio device, such devices 700 can be employed in scenarios where interference and power consumption are considerations. For instance, such a device 700 is suitable for in-room hospital use, where cell phone use is disallowed.

The device 700 may further include a memory for storing a call-list and a screen 702 for displaying the call list. A user can select a number of the sender, a number for the recipient, and a project identification number, all of which can be useful to map a certain transmission with a project. The memory can also be used to store a log of outgoing transmissions or incoming receptions, depending on whether the device 700 is used as a transmitter or a receiver. Accordingly, the device 700 can communicate data from a sensitive geographical area, such as within a hospital room, to another geographical area in which a storage resides.

The device 700 may further include logic for scanning the available frequencies for a channel over which data may most effectively be transmitted. In a specific embodiment, the device 700 also includes logic and a processor for encrypting signals being transmitted or decrypting signals being received. For selected signals being transmitted, the device 700 automatically inserts metadata into the transmission stream. The metadata includes reference indicia which identifies the date and time the transmission is executed and/or the signals are received.

Those skilled in the art would recognize that each embodiment of the communication system discussed above may be combined with other like embodiments or different embodiments. For example, the systems shown in FIGS. 1-4 may be implemented with a bank of parallel data communication interfaces 112 configured for connection to a plurality of transmission devices 102.

In another embodiment, a transmission device used by an observer of an event includes a memory for caching data representing the observation. The data is cached until a suitable connection is made available to a receiving device or directly to the computer system. The caching can include appending with reference indicia for storage in the local memory of the transmission device, or logic that appends the reference indicia when the cache is emptied and the data is transmitted to its ultimate destination for inclusion in the project log.

Figure 8:
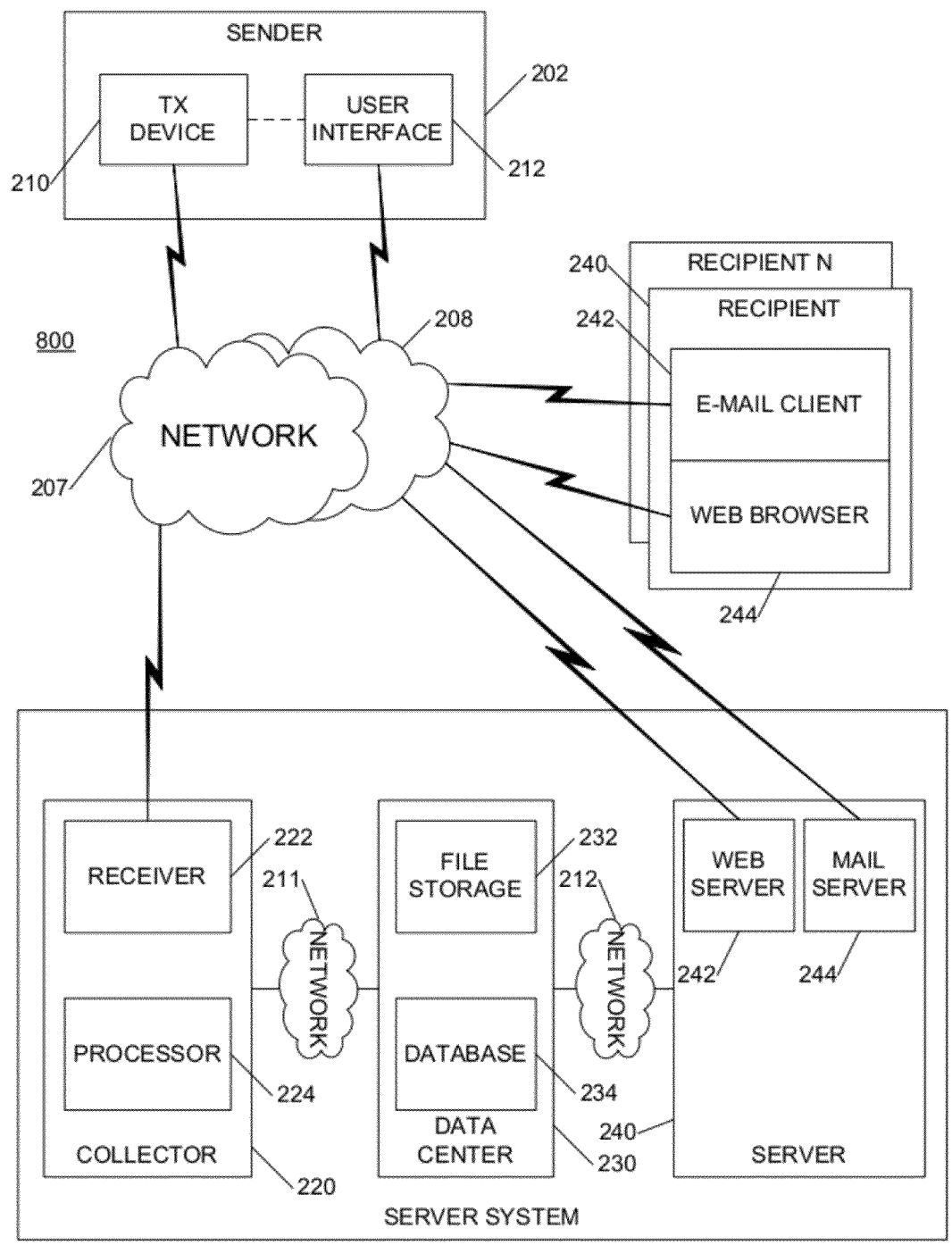
FIG. 8 shows a communication system according to another embodiment of the invention.

Referring now to FIG. 8, a communication system 200 is shown according to another embodiment of the invention. The system 200 includes a sender 202, a transmission device 210, a server system 208, and a recipient 240.

The sender 202 represents any person or entity that communicates a message—intended for a message recipient—to the transmission device 210. The sender's message is communicated to the transmission device 210 in one or more of many ways using a transmit action. The transmit action can include a single transmit action, such as pressing a button and speaking (i.e., "press-to-talk"), taking a photo or video, or touching a pad with a stylus. The transmit action also includes entering text, selecting choices from menus, etc. The message recipient can be a person, group of persons, a storage location on the server system, or both a storage location and a person or persons.

The transmission device 210 transmits the sender's 202 message via a communications network 207 to a particular, unique address of a file storage 232, which is one of a plurality of unique addresses associated with the server system 208. The communication network 207 may include at least one wireless link. The message is transmitted along with metadata, including at least a unique ID of the transmission device 210. Additional metadata sent with the message can include data representing the length, urgency, time of transmission, etc. of the original message. The unique addresses associated with the server system 208 need not be directly associated 'with an address or identity of any intended recipient 240, except by reference to related metadata stored in a database 234 in the server system 208.

The transmission device 210 can be a standard telephone, cell phone, Nextel phone with iDEN capability, radio or satellite phone, or wireless PDA or programmable phone device running special software, or other communication device. The unique address can be a POTS phone number, an iDEN private ID number, an IP address, a Uniform Resource Locator (URL) address, or other unique address that can be sent by the transmission device 210 and recognized by the server system 208.

In one embodiment, the server system 208 includes a collector 220, a data center 230, and a server 240. The collector 220 has one or more receivers 222, each of which has a unique address that is addressable by the transmission device 210. The receiver 222 receives the message and associated metadata, preferably in the format native to the particular type of transmission device 210 used. The collector 220 also includes a processor 224 which reformats the received message and associated metadata into a format meaningful to the memory structures in data center 230, which include the file storage 232 and the database 234, and routes the message metadata to the data center 230 over data center network 211. The data center network 211 can include a WAN, LAN, PAN, bus, or any other connection media or communications platform.

In an alternative embodiment, collector 220 can actually be interfaced with an electronic, or router, which can be capable of receiving and routing multiple unique addresses. Thus, the collector 220 can comprise an interfaced, such as an IP interfaced configured to interface collector 220 with such an electronic gateway. In such an embodiment, collector 220 can still comprise a receiver portion configured to receive messages and associated metadata routed from the electronic gateway, although not necessarily in the format native to the particular type of transmission device 210 used. The collector 220 can still also includes a processor 224 which reformats the received messages and associated metadata into a format meaningful to the memory structures in data center 230, and route the message metadata to the data center 230 over data center network 211.

The database 234 accepts the message metadata from the collector 220 and parses the received data into its components, including the content of the sender's message, and the unique transmission device identifier.

The server system 208 also includes the server 240, which has a web server 242 and a mail server 244. While functionally distinct, the web server 242 and mail server 244 may be a single server. Further, each server may be embodied as a servlet program resident on a host server platform. The server 240 is connected with the data center via server network 212, which like the data center network 211 can also include a WAN, LAN, PAN, bus or any other communications platform. Thus, the server 240 can include a farm of servers distributed among separate server devices or spread geographically via connections to the server network 212.

The server 240 receives requests from either the recipient 240 or the sender 202, and responds to requests either through the web server 242 or mail server 244. The mail server 244 transmits electronic notifications, via e-mail, to a requester or recipient of a message. The notification can include a hypertext link to the web server 242. The web server 242 receives a copy of a requested message from the data center 230, and serves up the copy in a web page to the requester or the recipient. The web page can be formatted according to a markup language, such as extensible markup language (XML) or hypertext markup language (HTML), and downloaded through the second communications network 208 via any transport technique to a browser or other rendering program.

The sender 202 also includes a user interface 212 for accessing and retrieving data from the server 240 of the server system 208 via the second communications network 208. The communications networks 207 and 208 may be one in the same, or completely different networks. The user interface 212 can be a computer, a phone, a PDA, or any other device capable of receiving data. In one embodiment, the user interface 212 includes a computer and a display, and the requested information is displayed as an HTML or XML page in a web browser program rendered on the display. Although represented in FIG. 8 as part of one sender block 202, it should be understood that the transmission device 210 and user interface 212 may be the same device, different devices, or even remotely positioned and/or operated by different persons.

The recipient 240 is a person or entity to which a sender's message is ultimately intended. FIG. 8 shows more than one recipient 240, but it should be understood that there can be any number of recipients 240. The recipient 240 includes an e-mail client 242 for receiving the notifications from the mail server 244, and a web browser 244, or other similar program, for receiving and rendering the messages from the web server 242. Messages may also be received from the mail server 244.

Figure 9:
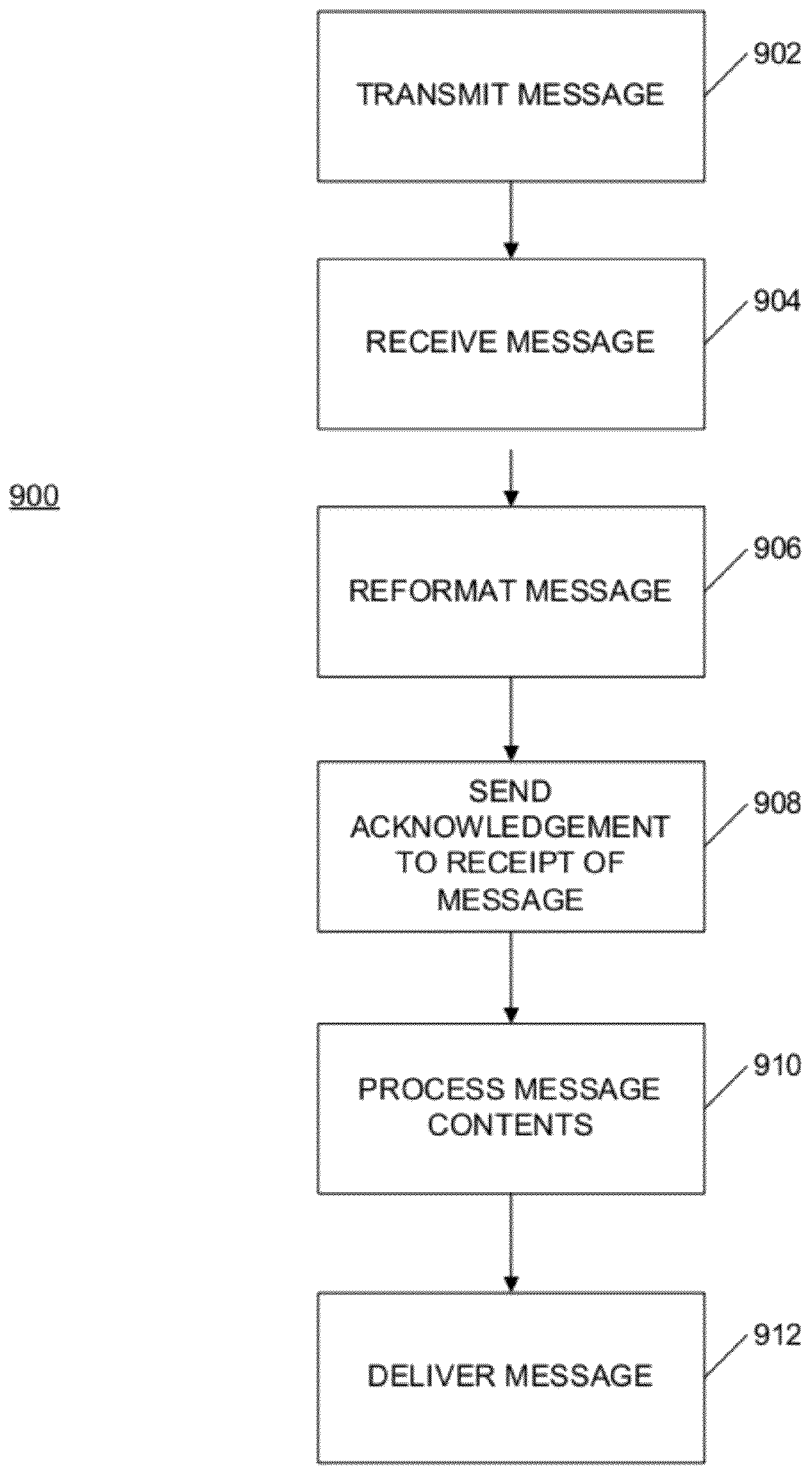
FIG. 9 is a flowchart of a method of originating, storing, processing and delivering message data.

FIG. 9 is a flowchart of a method 900 of originating, processing, storing, and delivering data according to an embodiment. A message is transmitted from a transmission device (block 902), and received by a receive device (block 904). The transmission device has a unique identifier, while the receive device is associated with an address to which the message is transmitted. The message is transmitted in a format native to the transmission device, and reformatted to a proprietary or standard format compatible with a database within the server system (block 906). The reformatted message includes at least the original message, the unique identifier of the transmission device, and the unique identifier of the address associated with the server system to which the message was addressed.

The reformatted message may be formatted in accordance with a markup language.

When the message is received, an acknowledgement (ACK) signal is sent back to the transmission device (block 908). The ACK signal can be a signal which causes the transmission device to emit an audible signal, or a signal which causes the transmission device to display a visual signal. At block 910, the received message and related metadata is processed for storage, after which the message contents and related metadata may be accessed and delivered to a recipient (block 912).

Figure 10:
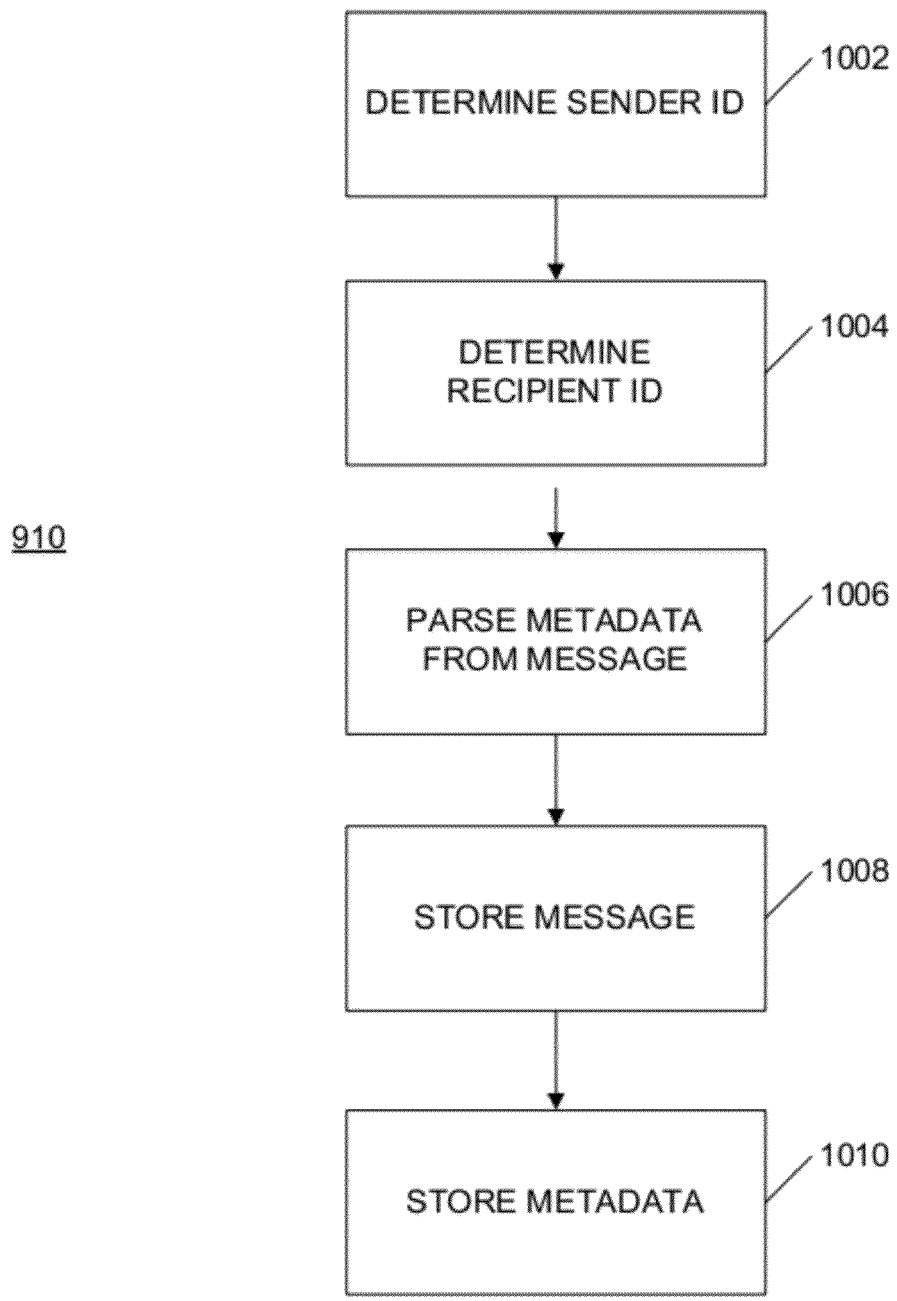
FIG. 10 is a flowchart of an expanded method of storing and processing message data.

FIG. 10 illustrates a method 910 of processing and storing a message according to an embodiment. The sender's identity is determined (block 1002) by reference to information previously stored in the database, where each unique transmission device identifier is associated with a unique sender identifier. Alternatively, the transmission device identifier serves as a proxy for the sender identifier. The recipient's address of the ultimate recipient is also determined (block 1004) by reference to information previously stored in the database, in which a unique combination of the sender (or transmission device) identifier and the receive address associated with the server system is associated with a unique recipient identifier of the ultimate recipient, and by reference to a network address of the ultimate recipient.

The message is parsed into its components, including content of the message and related metadata (block 1006). A file having the contents of the original message is stored in a storage associated with the server system (block 1008). Appropriate entries are made to a record in the database (block 1010) to enable the stored message to be located, retrieved and presented to authorized recipients upon request.

Figure 11:
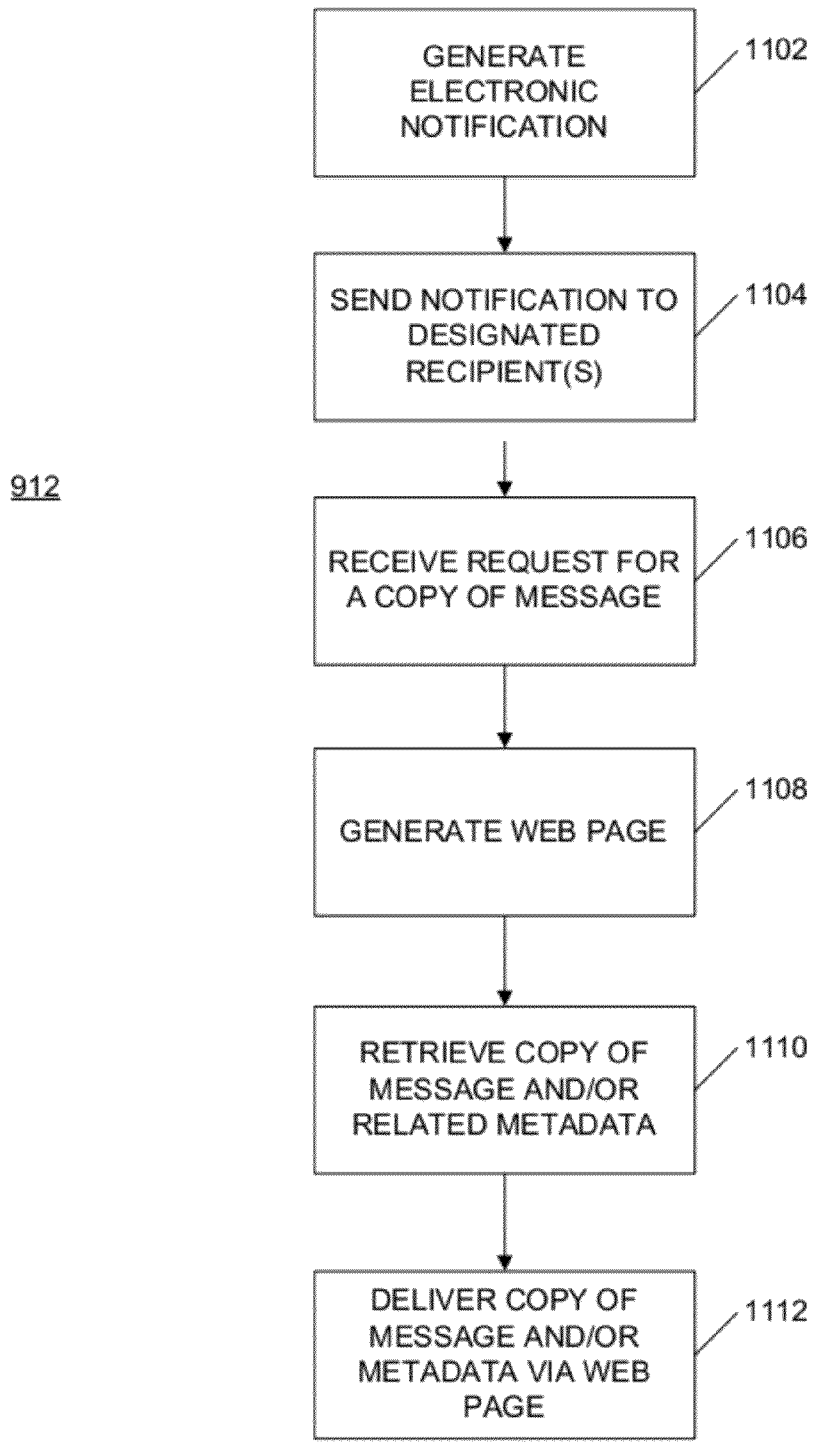
FIG. 11 is a flowchart of an expanded method of delivering message data to an intended recipient.

FIG. 11 illustrates a method 912 of delivering a message according to an embodiment. Once the message is received at the server system, an electronic notification is generated (block 1102) and sent to one or more designated and/or authorized recipients (block 1104). The notification is sent to a network address associated with each recipient. One type of notification includes an e-mail message delivered by an e-mail server. The e-mail message can include a link to the original message stored in the server system, or include a copy of the original message as an attachment. Another type of notification can be a voice or text message delivered to a phone or other communication device of the recipient.

When a link is employed, the link can include a hyperlink to allow access to the original message stored at the server system. In response to user selection of the link, a web page is generated (block 1108) and a copy of the original message is retrieved from storage (block 1110). The link can include embedded information allowing only the actual intended recipient of the link to access an active server page that would serve up the specific message to the browser on the computing device from which the link was activated. The embedded information can have a time stamp designating a certain time interval after which authorization to access the message expires. The embedded information can be included in a query string appended to a CURL) which identifies the location in the server system of the message to be accessed. The embedded information can also be encrypted.

Figure 12:
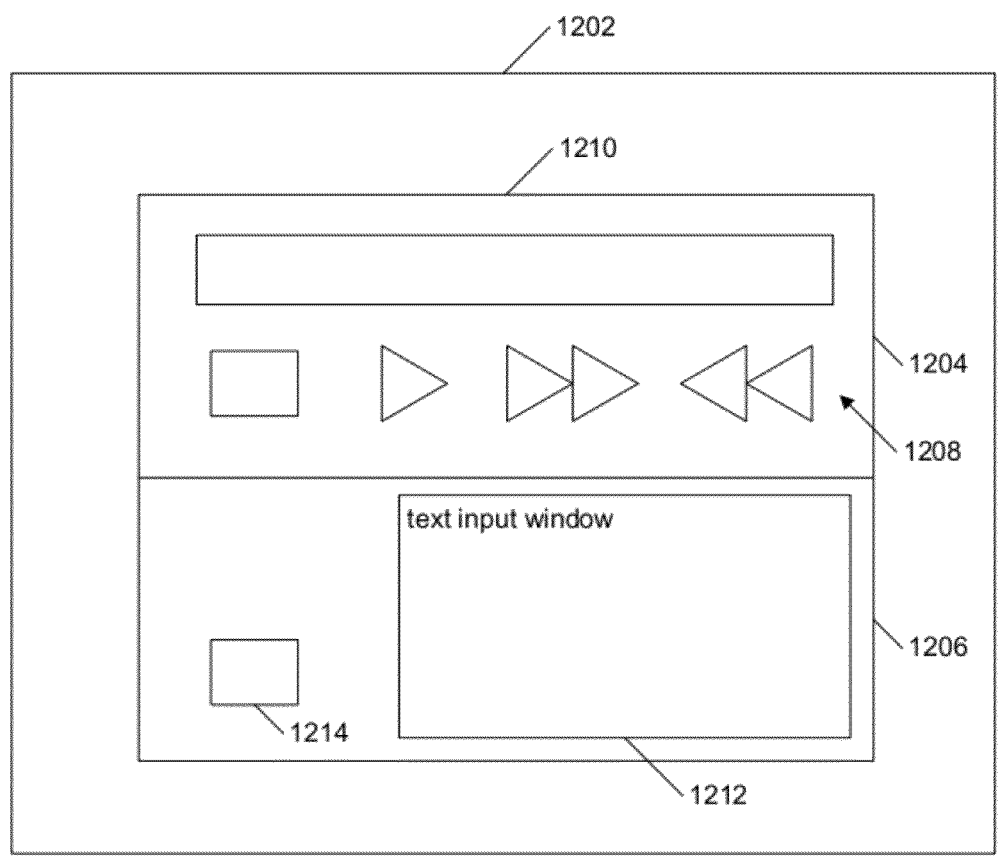
FIG. 12 is a display including an integrated media player and text input window.

A copy of the accessed message is delivered from the server system to an address associated with the recipient (block 1112). In one embodiment, the message is transmitted in a web page. FIG. 12 shows one embodiment of a web page 1202. The web page can be an active server page. The web page can include a media player 1204 to render the message to the recipient in whichever media format the original message exists. The media player 1204 can be locally stored on the recipient's computing device, or downloaded along with the message and used with the recipient's web browser. In one example, the original message is an audio file, and the media player plays a digital copy of the audio for the recipient to hear. The media player 1204 includes a graphical display 1210 for displaying status information or a rendering of the message, and a variety of user controls 1208 with which a user can control the playing of a message.

The web page can also include metadata associated with the message. The metadata includes time stamp information, and can include the time each message was accessed by each recipient, or which recipients have received and accessed messages. The metadata can be displayed in the media player graphical display 1210, or in a separate window. The metadata can also include additional information, such as a text transcription of the original message, the origination of which is described in greater detail below. According to one particular embodiment, the web page is accessible only to the sender of a message, enabling the sender to access previously transmitted messages and additional information associated with the messages.

The web page may also include a text input window 1206, which can be displayed separately from or combined with the media player 1204. The text input window includes a text box 1212 for receiving text from a user input device such as a keyboard, keypad, touchpad, or voice input device used with a voice-to-text conversion program. Other user input devices can also be used. The text includes a transcription of the message, a reply associated with the message or the sender, or a comment.

The text input window 1206 further includes a transmit control 1214, such as a graphical tab or button for example, which can be used for transmitting the text to one or more addresses. In one embodiment, the text is transmitted back to the server system for storage with the message. In the embodiment, the text is tagged with pointers to the message so that the text is accessible when the message is accessed. Alternatively, the text is appended to the message and stored in the same memory.

In another embodiment, the text is sent to the sender, with or without being stored at the server system. The message or its notification to the recipient can include an address for the sender, such as the sender's transmission device or other terminal device able to receive and render the text. The text input window transmit control 1214 causes a program to reformat the text to a transmission format which is compatible for each text recipient.

Figure 13:
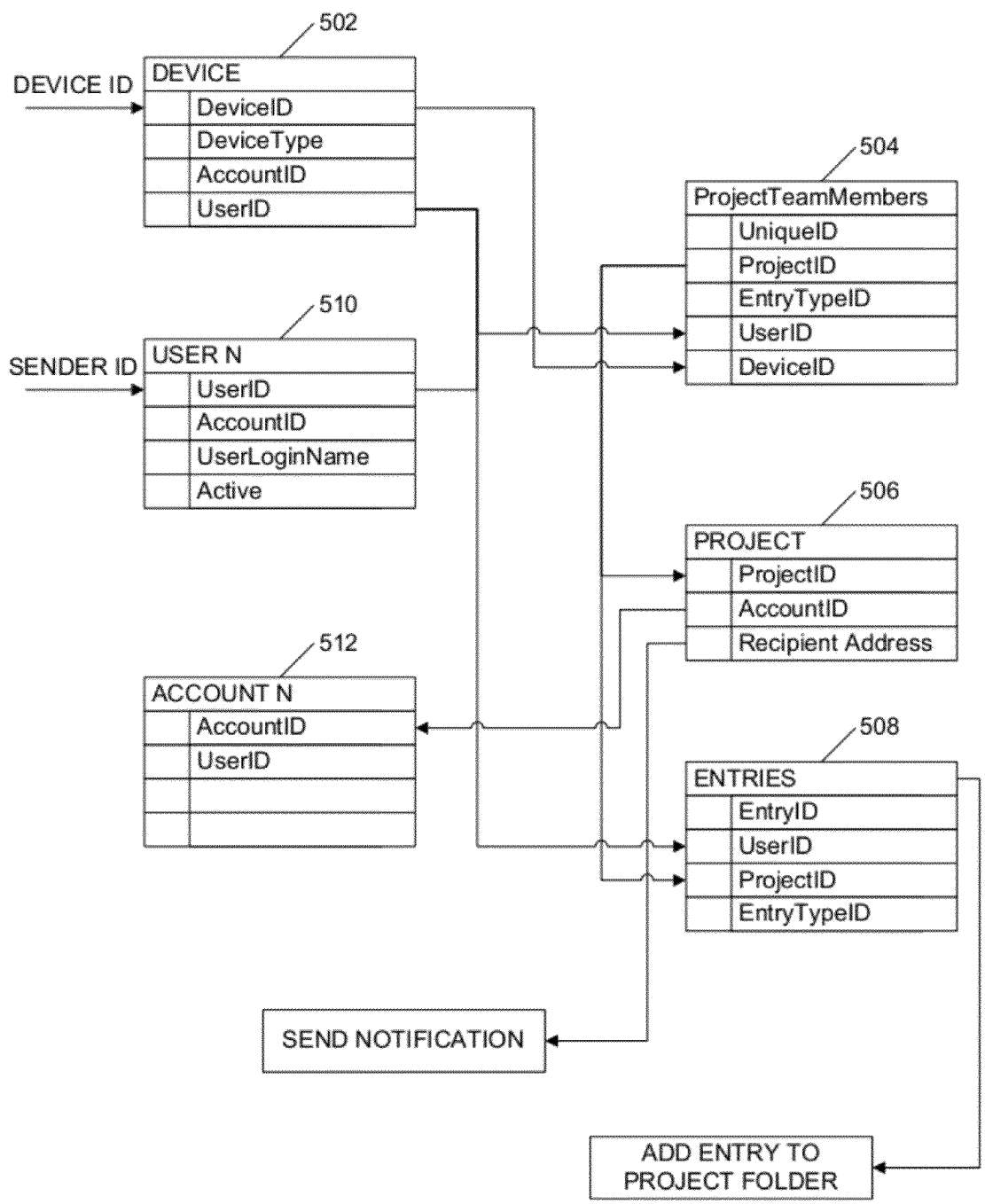
FIG. 13 illustrates a display and user interface including a media player and text input window according to an embodiment.

FIG. 13 illustrates a series of look-up tables for automatic processing of messages. As described above, a system according to an embodiment can determine additional information about a message based on several parameters included with metadata received with the message. In an example shown in FIG. 13, a device ID and a sender ID are received along with a message. The device ID is preferably an identifier of a receiver connected with the server system, but can also be an interface address associated with the collector of the server system, or any other interface to the transmission device which sent the message. The sender ID is preferably either the unique device identifier of the transmission device, or an identifier associated with the sender or user of the device.

The device ID and sender ID are provided to look-up tables, represented by a DEVICE table 502 and a USER table 510, respectively, to resolve additional other information related to the message. The device ID is combined with the sender ID (i.e., "UserID") in another table, represented as a ProjectTeamMembers table 504, to determine a project identifier (ProjectID) of a project associated with the sender and the message. The project identifier can then be used to access a PROJECT table 506 which can include, for example, an address of an intended recipient to which a notification is to be sent. The project identifier can also be used to determine which entry should be accessed (EntryID from the ENTRIES folder 508) for storing the message and/or metadata as an entry in the database. An ACCOUNT folder 512 may also be accessed with reference to an AccountID determined from the PROJECT folder 506.

While the tables in FIG. 13 show one embodiment of using look-up tables for compound indexing to automatically process messages and metadata, it should be understood that these tables are exemplary only. The tables, table names, and table content can take any form. Further, more or less tables than those which have been described can be used. The tables provide scalability of a system to accommodate any number of users, including senders and recipients, without having to significantly alter the system architecture or method of operation thereof.

Figure 14:
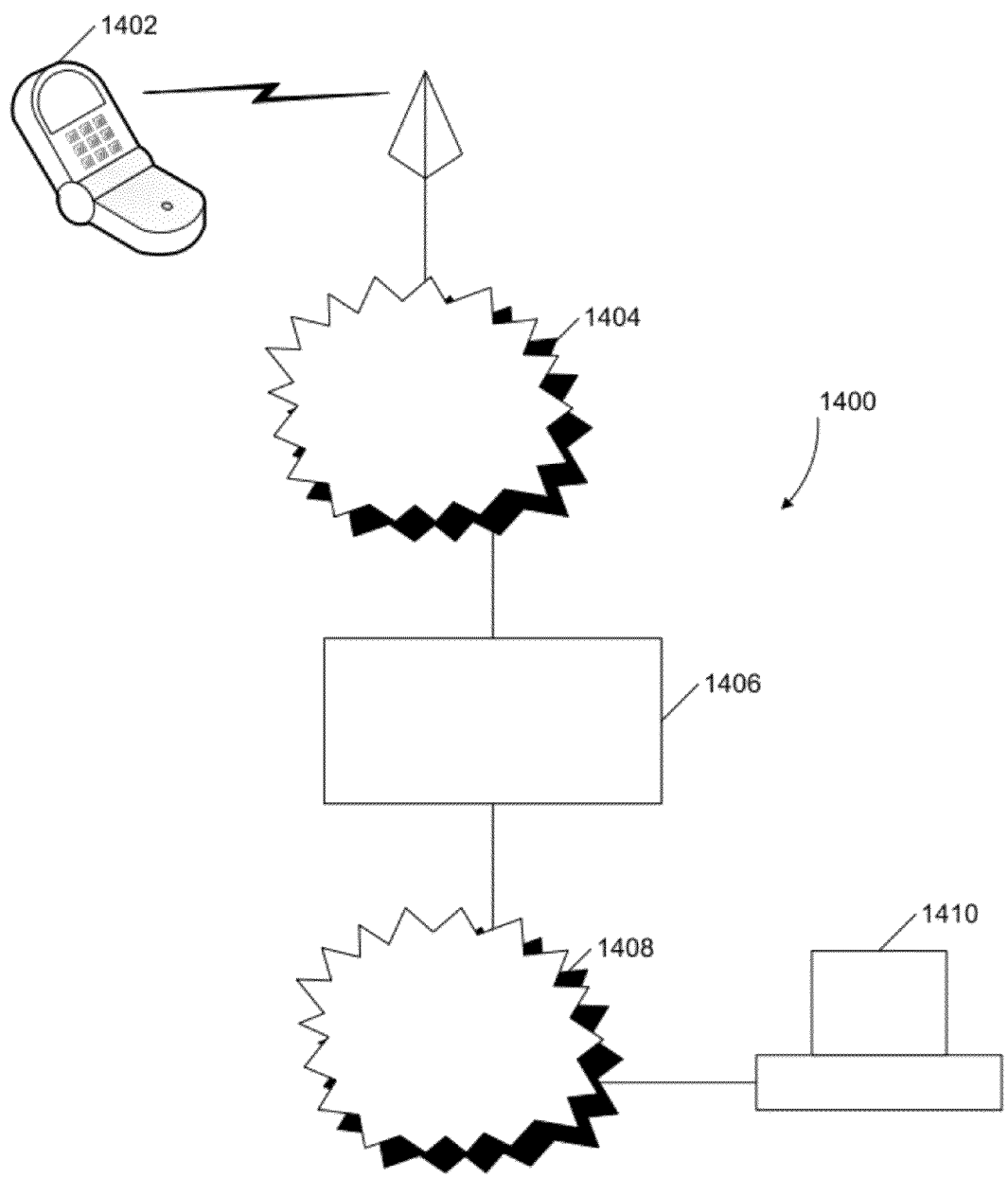
FIG. 14 illustrates an example communication system according to one embodiment.

FIG. 14 is a diagram of a communication system 1400 that can be configured for efficient communication using a mobile device 1402 in accordance with one embodiment of the systems and methods described herein. System 1400 can be similar to system 800 described in relation to FIG. 8. Thus, system 1400 can comprise a communication device 1402 configured for mobile communication that can be a device similar to device 210 also described in relation to FIG. 8. Specifically, communication device 1402 can have a transmit action input enabling a user of communication device 1402 to reply to data messages received by device 1400 using a simple transmit action. As described above the term transmit action can refer to a variety of actions that result in some form of input and/or indication being received by communication device 1402.

For example, with push-to-talk type phones, the transmit action can be the depression and then release of the push-to-talk input mechanism. Thus, when the push-to-talk input mechanism is activated, the process of replying can be initiated, and when the push-to-talk mechanism is deactivated, the process of replying, at least form the perspective of communication device 1402, can be completed. The push-to-talk mechanisms can comprise a button, e.g., on the side of communication device 1402, that operates in a manner similar to a walkie-talkie, i.e., the user depresses and holds the button to talk, and releases the button when they are done.

It should be apparent that the push-to-talk mechanism can comprise some other type of input mechanism such as a key on a keypad, an active input on the display of communication device 1402, e.g., one that is activated using a stylus, or any other mechanism that is incorporated into communication device 1402. Moreover, the transmit action can actually be accomplished using more than one input mechanism. For example, one button can be activated to cause communication device 1402 to begin the process of creating a voice reply, while another button can be used to indicate that the reply is complete. The second button can, for example, also cause the reply to be sent. Alternatively, a third button, or input mechanism, can be used to cause communication device 1402 to send the reply.

In other embodiments, a single mechanism, such as those described above, can be used; however, multiple inputs generated using the single mechanism can be required. For example, in one embodiment, a push-to-talk type mechanism can be used, but the process or replying can require the user to press, or activate, the push-to-talk mechanism once to initiate the reply process, and then press, or activate, the push-to-talk mechanism a second time to end the process, at least from the perspective of communication device 1402.

In other embodiments where, for example, communication device 1402 is configured for voice recognition, the transmit action can also comprise speaking voice commands, such as "generate voice message" and "send voice message."

In short, the term transmit action is intended to refer to a simple action, or set of actions, that can be easily performed to initiate and terminate the reply process from the perspective of communication device 1400. Thus, by using the transmit action, the inefficiency of scrolling through menus, or contact lists, activating certain programs, and/or interfacing with remote servers in order to generate and send a reply can be avoided.

Communication device 1400 can be interfaced with a message authority 1406 through a network 1404. Message authority 1406 can, for example, be a server system, such as server system 208 described in relation to FIG. 8. Thus, message authority 1406 can, depending on the embodiment, comprise a collector 220, data center 230, and communication server 240. In general, message authority 1406 can be configured to receive messages and route them to the appropriate destination. Message authority 1406 can also be configured to format the messages and to store the messages and/or related data, e.g., metadata as required by a particular implementation.

The term "authority" used to identify message authority 1406 is intended to indicate that communication devices 1400 and client device 1410 communicate with message authority 1406 through the communication and computing systems, hardware and software, associated with message authority 1406. Thus, depending on the embodiment, the term authority can refer to one or more servers, such as Internet or web servers, file servers, and/or database servers, one or more routers, one or more databases, one or more software applications, one or more Application Program Interfaces (APIs), one or more communication networks, such as PANS or LANs, and one or more communication buses, or some combination thereof. Further, the computing system associated with message authority 1406 can include one or more computers or computer terminals. Moreover, custom communication interfaces, such as those associated with collector 220, can also be included in message authority 1406.

Because communication device 1402 can be a mobile communication device, it can also comprise a wireless transceiver configured to enable communication device 1042 to send and receive wireless signals. Thus, network 1404 can comprise some form of wireless communication network, such as a wireless PAN, wireless LAN, wireless WAN, or a wireless Metropolitan Area Network (MAN).

Message authority 1406 can also be configured to interface with a client device 1410 via network 1408. Client device 1410 can be any device configured to communicate data messages, e.g., using an email client 242 or web browser 244, over network 1408. Further, all or part of network 1408 can comprise part of network 1404, or network 1408 can be completely separate form network 1404 depending on the embodiment.

The ability for communication device 1402 to quickly and efficiently generate a message using a transmit action and send it to a message authority 1406, where it can be recorded and stored, is described in detail above. In addition, however, system 1400 can be configured to allow a user of client device 1410 to generate a data message, such an email message, and send it to communication device 1402. Communication device 1402 can be configured to receive the data message and to cause a voice reply to be generated and sent to client device 1410 by simply performing a transmit action using the transmit action mechanism associated with communication device 1402 and speaking an appropriate reply. The spoken reply can be captured by communication device 1402 and used to generate the voice reply, which is sent to client device 1410. The voice reply can, for example, comprise a voice message that can be accessed and played using client device 1410.

Accordingly, a user of communication device 1402 can quickly and efficiently communicate with a user of client device 1410 by simply activating the transmit mechanism and speaking into communication device 1402. Further, the user of client device 1410 can access the voice reply at their convenience, which can make communication more efficient for the user of client device 1410 as well.

Figure 15:
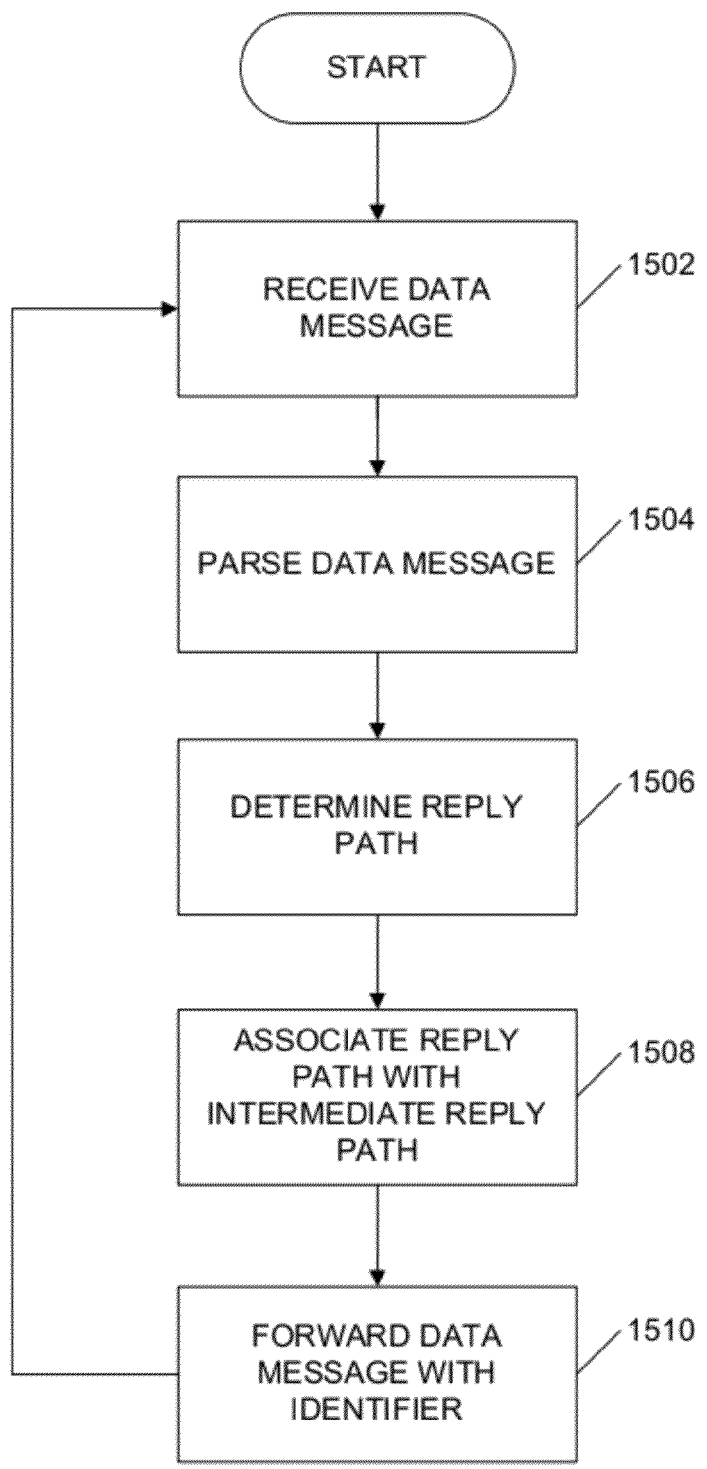
FIG. 15 is a flow chart illustrating an example method for forwarding a data message to a communication device in accordance with one embodiment.

In the embodiment illustrated in FIG. 14, message authority 1406 can act as a go between to facilitate communication between client device 1410 and communication device 1402 as briefly described above. FIG. 15 is a flow chart illustrating an example method for communicating between communication device 1402 and client device 1410 using message authority 1406 in accordance with one embodiment of the systems and methods described herein.

The process of FIG. 15 begins in step 1502 with the receipt by message authority 1406 of a data message generated by client device 1410. In one embodiment, for example, client device 1410 generates and sends a text message such as an email. Thus, the data message received by message authority 1406 can include some textual content. The data message generated by client device 1410 can be any type of data message. Thus, for example, the data message can be generated using an Instant Messaging (IM) application or the like.

Similarly, the data message can be an SMS or two-way text message. Moreover, the content of the data message can include other content instead of, or in addition to, textual content. For example, the data message can include, depending on the embodiment, audio content.

The data message received by message authority 1406, in step 1502, can also include an identifier that can be used to determine a reply path associated with client device 1410. Thus, message authority 1406 can be configured to parse, in step 1504, the received data message in order to determine the reply path associated with client device 1410. In certain embodiments, the data message can then be forwarded to communication device 1402 with the reply path included. For example, if message authority 1406 is an email server, then the data 'message, which would be an email message in this case, can be forwarded to communication device 1402. The email message received by communication device 1402 will then include the email reply path as with any other email message.

In the example of FIG. 15, however, message authority 1406 can be configured to associate the reply path with an intermediate reply path in step 1508. The data message can then be forwarded, in step 1510, to communication device 1402. But the forwarded message can include an identifier that can be used to determine the intermediate reply path instead of the actual, or final reply path determined in step 1506.

For example, if message authority 1406 includes a collector as described above, then the intermediate reply path can specify which of the receivers included in the collector is associated with the reply path determined in step 1506. Thus, the data message received by communication device 1402 can include an identifier that can be used to determine which of the receivers communication device 1402 should connect with when replying to the data message. In alternative embodiments, an electronic gateway or router configured to route the voice reply to message authority 1405, which can in turn be configured to direct the voice reply to the appropriate destination within message authority 1406 based on the identifier.

Figure 16:
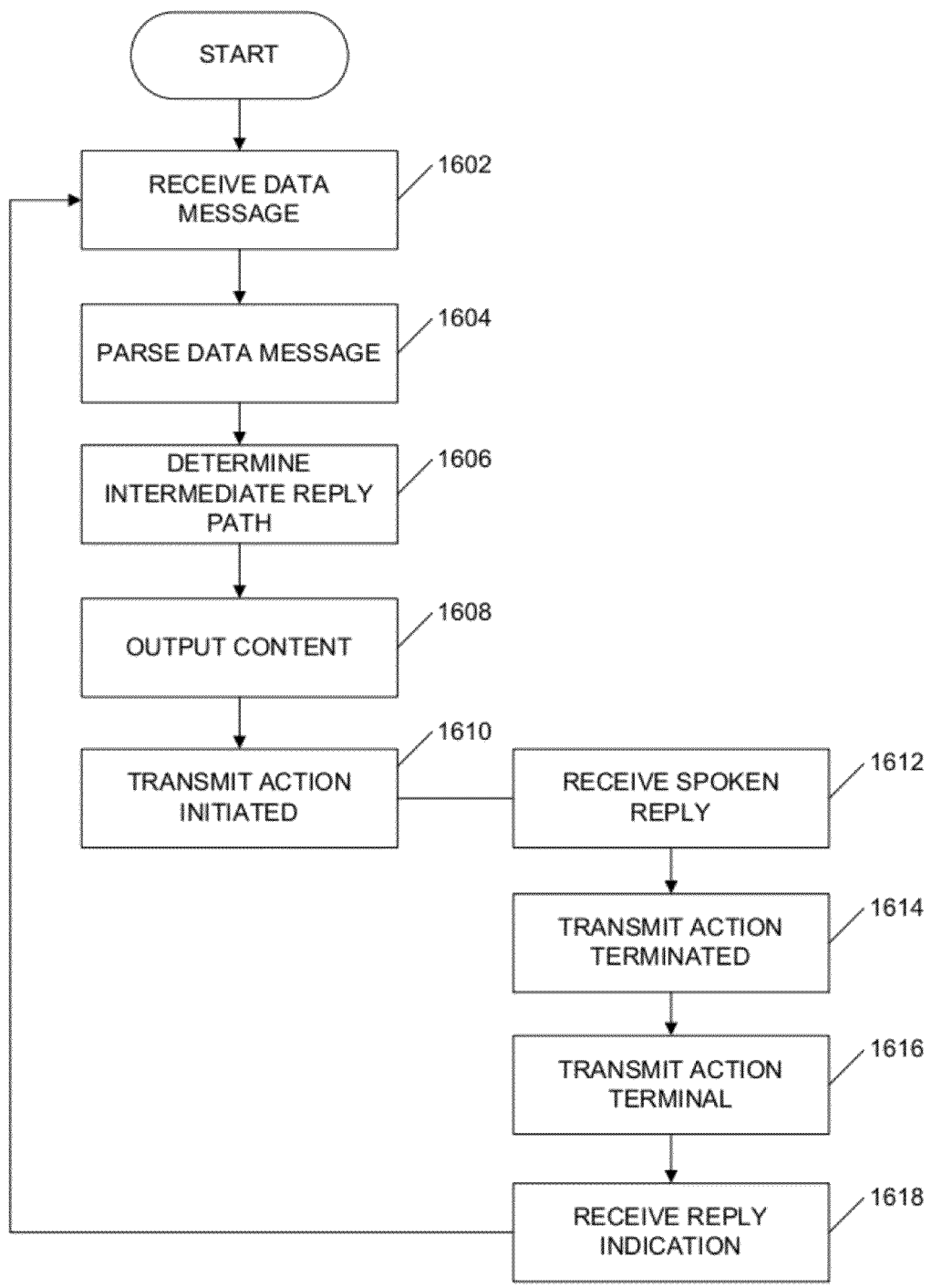
FIG. 16 is a flow chart illustrating an example embodiment for replying to a data message with a voice reply in accordance with one embodiment.

FIG. 16 is a flow chart illustrating an example process whereby communication device 1402 can receive and reply to a data message in accordance with one example embodiment of the systems and methods described herein. First, in step 1602, communication device 1402 can be configured to receive the data message. In step 1604, the content of the data message can be output to a user of communication device 1402. Thus, for example, if the data message comprises textual information, then outputting the content in step 1604 can comprise displaying the textual content on a display associated with communication device 1402. Communication device 1402 can also be configured to parse the data message, in step 1606, to determine the reply path associated with the data message in step 1608, e.g., using an identifier included with the data message.

Depending on the embodiment, the data message can be stored on communication device 1402 for later retrieval, e.g., retrieval at the convenience of the user. In step 1610, the user can then initiate a transmit action using a transmit action mechanism associated with communication device 1402 and reply to the data message, or more specifically the content of the data message, by speaking into communication device 1402. Thus, in step 1612, communication device 1402 can be configured to receive the spoken reply.

In the embodiment of FIG. 16, the spoken reply is then transmitted by communication device 1402 in step 1616, in response to the termination of the transmit action in step 1614. For example, in one implementation, the transmit action mechanism can be a push-to-talk type of input mechanism. Thus, initiating the transmit action in step 1610, can comprise pressing and holding the push-to-talk input mechanism and terminating the transmit action in step 1616 can comprise releasing the push-to-talk input mechanism. Alternatively, initiating the transmit action in step 1610 can comprise pressing and releasing the push-to-talk input mechanism and terminating the transmit action in step 1614 can comprise pressing and releasing the push-to-talk input mechanism a second time.

As explained above, a variety of transmit action mechanisms and combinations of actions can be used to effect the initiation and termination of the transmit action as described in relation to FIG. 16; however, unlike conventional systems, there is no need to navigate through a variety of menus, or to activate a special program in order to reply to the data message received in step 1602. Moreover, the reply can be made by simply speaking into communication device 1402. The spoken reply can then be formatted into a voice message that can be sent to client device 1410 as a voice reply. This process is described in more detail below.

The spoken reply can be transmitted, in step 1616, along the reply path indicated by the identifier associated with the received data message and determined in step 1608. As described below, the reply path can be the actual or final reply path, or it can be an intermediate reply path associated, e.g., with message authority 1406.

In step 1618, communication device 1402 can receive a response indicating whether the reply was successfully received. For example, some form of audible indication can be received and output by device 1402. In one particular implementation, an audible indication comprising three tones, or "beeps", is received if the reply is successful.

Figure 17:
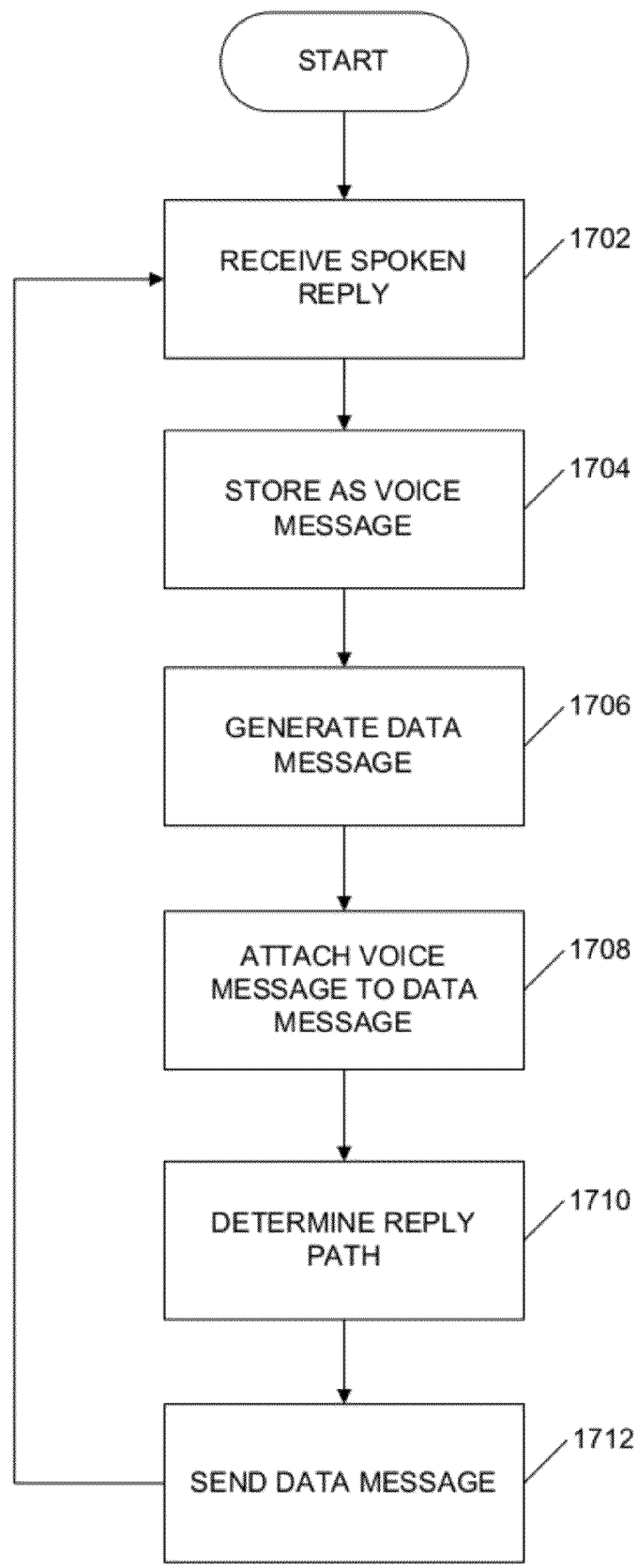
FIG. 17 is a flow chart illustrating an example method for generating a voice reply using a message authority in accordance with one embodiment.

In the example of FIG. 16, communication device 1402 can simply transmit the spoken reply in much the same way that a mobile device would normally transmit messages spoken into the device. In such embodiments, message authority 1406 can be configured to receive the spoken reply and to generate from the spoken reply a voice reply that can be sent to client device 1410. FIG. 17 is a flow chart illustrating an example method for creating a voice reply using message authority 1406 in accordance with one example embodiment of the system and methods described herein.

First, in step 1702, message authority 1406 receives the spoken reply, e.g., using a collector as described above. In step 1704, the spoken reply can be stored as a voice message. It will be understood that when a communication device, such as communication device 1402, transmits voice signals, the voice signals are often processed and formatted for transmission via network 1404. For example, the voice signals are often digitized, compressed, and then packaged according to the protocols associated with network 1404. Thus, in order to store a spoken reply as a voice message in step 1704, it will be understood that message authority 1402 will often be required to process and format the received spoken reply. The processed spoken reply can then be stored as a voice message, e.g., the spoken reply can be saved as a digital audio file.

Message authority 1402 can be configured to then generate a data message, e.g., an email, in step 1706, and to attach the voice message in step 1708 for transmission to client device 1410. In certain embodiments, the received spoken reply can be processed and formatted into a voice message and attached to a data message without being stored in step 1704, although practically, the voice message needs to be stored at least temporarily during the process.

The combination of the data message and attached voice message is referred to herein as a voice reply. The voice reply is transmitted, in step 1712, to client device 1410. First, however, the reply path associated with client device 1410 is looked-up and used to send the voice reply to client deice 1410. For example, message authority 1402 can store the reply path determined in step 1506. The reply path can then be accessed in step 1710.

In one embodiment, compound indexing, as described above, can be used to access the reply path. For example, when the reply path is determined in step 1506, it can be associated with the intermediate reply path, e.g., that identifies which receiver, or a receiver identifier, that communication device 1402 should use to reply to the data message. When the spoken reply is received in step 1702, it can comprise and identifier that can be used to identify the user of communication device 1402. The combination of the user identifier and intermediate reply path can then be used to access the reply path.

It should be noted that the user identifier can simply identify communication device 1402; however, in embodiments where more than one user can use communication device 1402 it is preferable that the identifier associated with the spoken reply identify the actual user.

Figure 18:
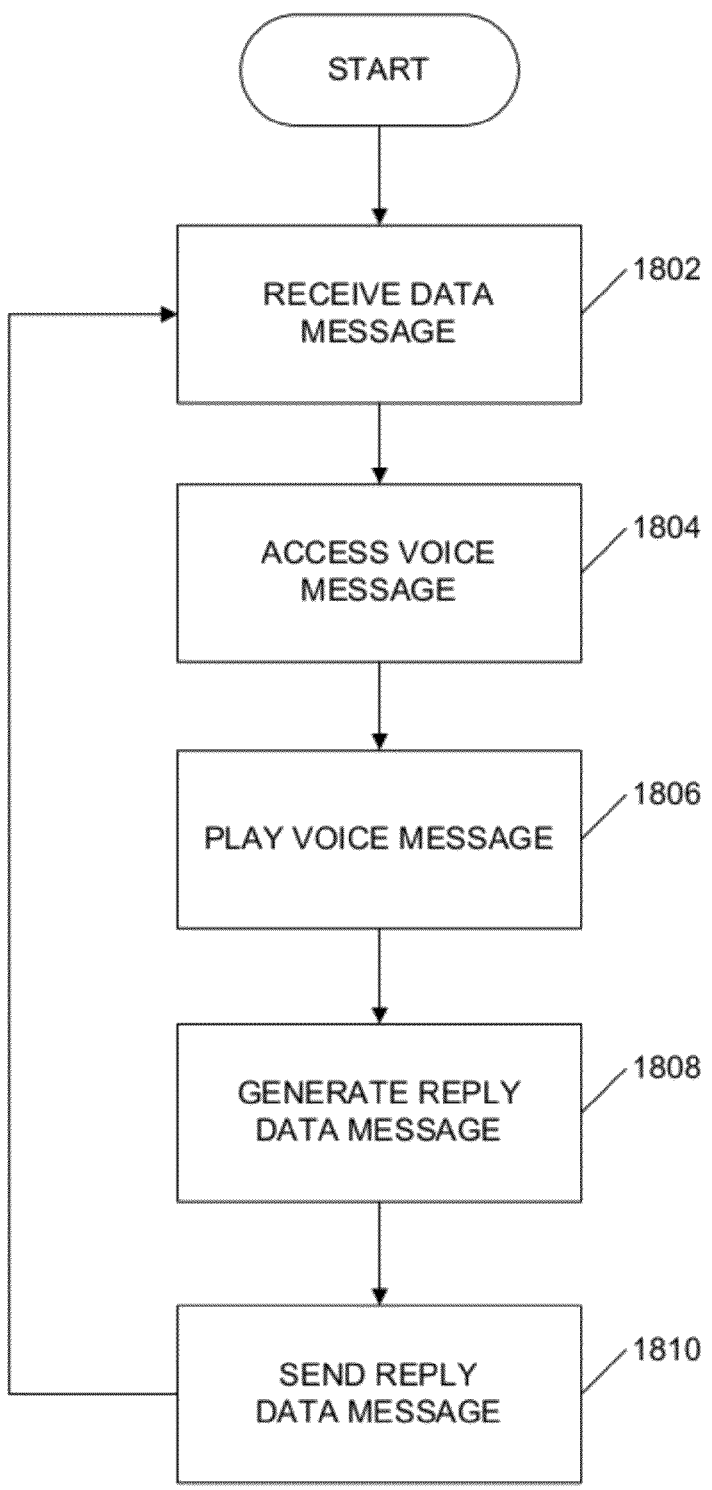
FIG. 18 is a diagram illustrating an example method for retrieving a voice message in accordance with one embodiment.

FIG. 18 is a flow chart illustrating an example method whereby client device 1410 can receive a voice reply according to one embodiment of the systems and methods described herein. First, in step 1802, client device 1402 receives the voice reply. Thus, receiving the voice reply in step 1802 can comprise receiving the data message, e.g., generated in step 1706, and then accessing an attached voice message. The data message can, for example, comprise an email that client device 1410 receives using an email client, such as email client 242.

Alternatively, client device 1410 can comprise a web browser 244 and receiving the voice reply in step 1802 can comprise accessing a web page through which the voice message can be accessed. As explained in relation to FIG. 12, the web page can include a media player 1204 to render the voice message in whichever media format the voice message exists. Thus, in certain embodiments, a data message, such as an email can be used to provide access to the voice message. Attached to, or embedded in, the email can be a link, or similar mechanism, that allows client device to access a web page and play the voice message.

Again, as explained above, the voice message can be delivered to, and stored on client device 1410. Alternatively, the voice message can be maintained on message authority 1406 and accessed using client device 1410 when it is convenient for the user.

Accordingly, in step 1806, the voice message can be played via client device 1410. For example, the voice message can be played using media player 1204.

It should be noted that the voice message does not necessarily need to be attached to the data message sent to client device 1410. Rather, as just described, a data message can be sent to client device 1410 informing a user of client device 1410 that a voice message is pending. The user can then access the voice message directly, e.g., using a web browser 244.

In certain embodiments, client device 1410 can be configured to allow the user to quickly generate a reply data message, in step 1808, and send it back to communication device 1402 in step 1810. For example, the process for replying to the received voice reply can be similar to that described in relation to FIG. 12 for replying to a received audio message. Thus, a web page accessed using client device 1410 can include a text input window 1206, which can, for example, be displayed separately from or combined with media player 1204. Text input window 1206 can be configured to receive an input from an input device such as a keyboard, keypad, touchpad, or a voice input device used with a voice-to-text conversion program.

The data message received from message authority 1406, in step 1802 can also comprise an identifier that can be used to determine a reply path associated with the data message. Depending on the embodiment, the reply path can be associated with communication device 1402, or for example, with message authority 1406. Thus, the reply data message can be sent, in step 1810, to message authority 1406, where it can be processed in the same manner as the original data message (see FIG. 15) and then routed to communication device 1402. Communication device 1402 can then receive the reply data message and generate another voice reply.

Figure 19:
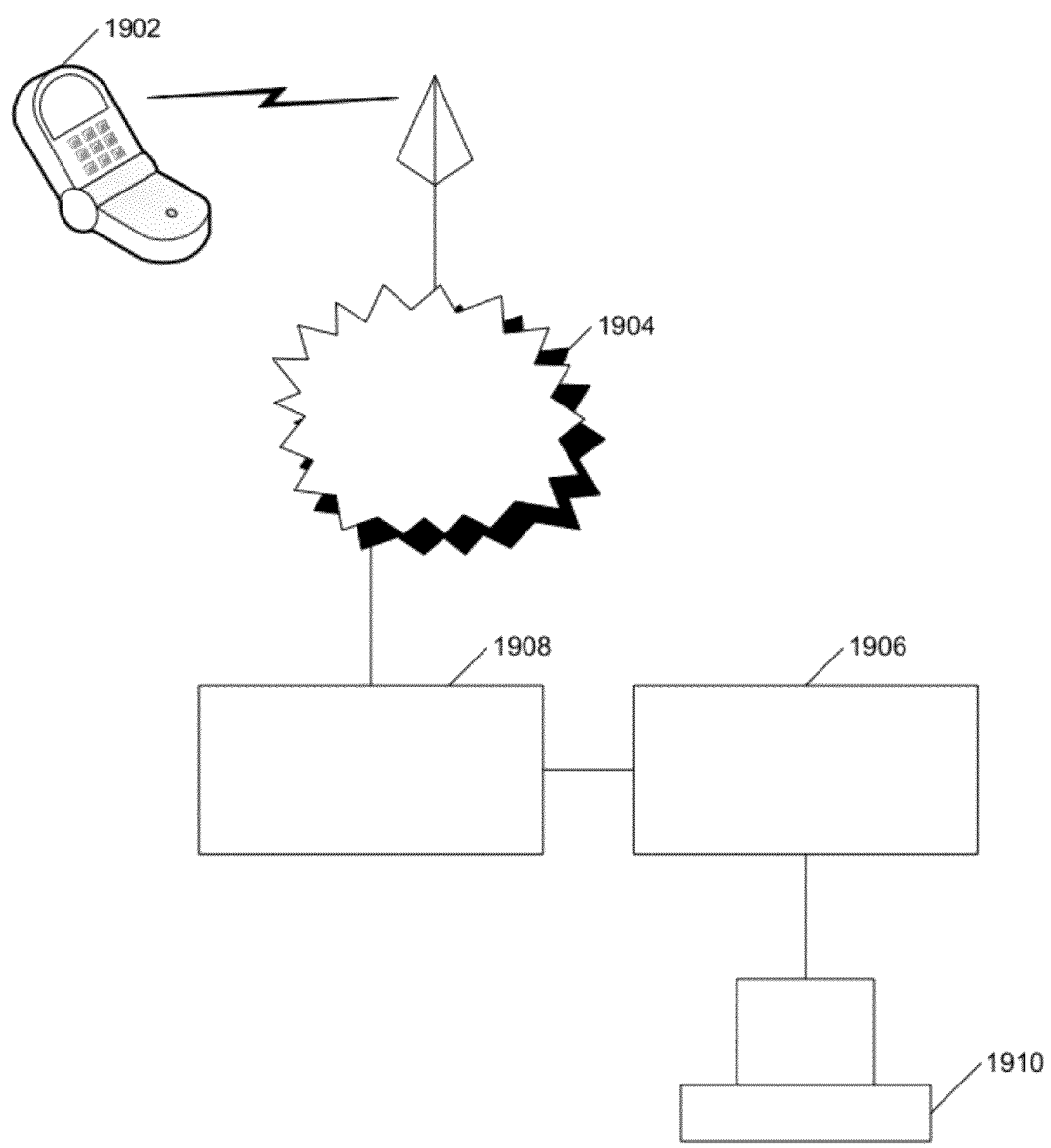
FIG. 19 illustrates another example communication system in accordance with one embodiment.

FIG. 19 is a diagram illustrating an alternative embodiment of a communication system 1900 configured in accordance with one embodiment of the systems and methods described herein. System 1900 illustrated in FIG. 19 includes a communication device 1902 as well as a client device 1910. These devices can be similar to devices 1402 and 1410, respectively, as illustrated and described in relation to FIG. 14 above; however, in the example of FIG. 19, communication device 1902 can be configured to generate a voice reply and forward it to client device 1910 without the aid of message authority 1406.

Accordingly, communication device 1902 can be configured to receive a data message from client device 1910, output, e.g., display, the content of the data message, and receive a spoken reply initiated using a transmit action. Once the spoken reply is received, communication device 1902 can be configured to format and store the spoken replay as a voice message. Communication device 1902 can be configured to then generate a voice reply that includes the voice message and forward it directly to client device 1910 using a reply path determined from an identifier included in the received data message.

For example, in one embodiment, communication device 1902 can be configured to receive an email data message directly from client device 1910. Thus, as with any other email message, the data message that is received by communication device 1902 should include the email reply path. It should also be understood, that client device 1910 will, in such embodiments, be interfaced with an email server 1906 to facilitate the sending and receiving of emails, as will communication device 1902. Accordingly, in the example of FIG. 19, communication device 1902 is illustrated as being interfaced with some form of message server, i.e., an email server 1908, through a wireless network 1904.

In general, communication device 1902 and client device 1910 should be interfaced with some form of message server to facilitate direct communication, i.e., communication without the aid of message authority 1406; however, such message servers, e.g., message servers 1908 and 1906, can still be referred to as message authorities.

In order to generate a voice reply, communication device 1902 should have the capability of receiving the spoken reply, in response to a transmit action, and saving it as a voice message. Communication device 1902 should also have the capability to generate a data message, attach the voice message, and transmit the data message and attached voice message to client device 1910, e.g., via message servers 1908 and 1906.

Similarly, client device 1910 can have the capability to receive the data message and attached voice message and to play the attached voice message. In one embodiment for example, communication device 1902 includes and email client 242 as does client device 1910. Additionally, communication device 1902 includes the processing and memory capabilities to receive the spoken reply and save it as a voice message, e.g., a digital audio file. Communication device 1902 can be configured to then generate the voice reply and send it to client device 1910. Client device 1910 can then have the ability to access the voice message and play it for the user.

It should be noted that the data message received by communication device 1402, or 1902, can comprise a request for specific information. For example, the data message can be originated by a dispatcher requesting a user associated with communication device 1402 to make a specific pickup or drop off, e.g., the user can be a taxi driver and the data message can include a request that the taxi driver make a certain pickup. The voice reply sent to client device 1410, or 1910, in response to the data message can then comprise a response to the specific request contained in the data message.

Accordingly, the systems and methods described herein can be used to facilitate quick and efficient communication of essential information. The result can be increased efficiency and a reduction in costs created by delays and/or miscommunication.

As described in relation to FIG. 19, the systems and methods described herein do not necessarily need a custom or modified message authority; however, further aspects of the systems and methods can be enabled depending on the functionality included in communication device 1402, message authority 1406, and/or client device 1410. For example, message authority 1406 can be configured to allow a user of communication device 1402 to access and maintain user profile information including an address book. In certain embodiments, the user can access message authority 1406 to update and maintain their user profile information using their communication devoice 1402. In other embodiments, however, the user can alternatively, or in addition, access message authority 1406 using a client device 1410 to maintain their user profile information.

In one embodiment, for example, the user can access message authority 1406 via a web browser interface to update their user profile information. In one particular implementation, the user accesses a web page being hosted by message authority 1406 and enters a user name and/or password to access their user profile. Once the user has accessed their user profile, the user can update their user profile information, such as their user name, password, contact information, etc. Further, the user can, depending on the embodiment update and maintain an address list as well.

For example, in one embodiment, a contact can be associated with an identifier that can be used to identify a communication path associated with the contact. The contact and the associated identifier can then be stored in an address list associated with the user. When the user wants to send a voice message to a particular contact as described above, the user's communication device can use the identifier associated with the intended recipient.

In one specific implementation, for example, communication device 1402 is a push-to-talk device that uses push-to-talk numbers to allow communication between push-to-talk devices. Thus, each contact can be associated with a push-to-talk number. The user can then access message authority 1406 and enter contact names. Massage authority 1406 can be configured to then associate those contact names with a push-to-talk number. The contact names, and associated push-to-talk numbers, can then be uploaded to communication device 1402, e.g., via network 1404, or they can be manually input into communication device 1402, depending on the implementation.

If the user of communication device 1402 then wants to send a voice message to one of the contacts, the user can simply select the contact push-to-talk number, e.g., using a transmit action, and speak into communication device 1402 to generate a voce message.

In other embodiments, such as the embodiment illustrated in FIG. 19, where communication device 1902 is capable of sending and receiving data messages, an address list does not necessarily need to be configured and loaded into communication device 1402 before it can be used to send voice messages. This is because an identifier, such as an email address, can be input directly into communication device 1402 when generating a voice message. Moreover, a received data message will generally include an identifier, such as the email reply path that can be used to identify the reply path associated with the received data message. Thus, simply by initiating a transmit action, a voice reply can be generated and sent to the sender of the data message without the need to configure an address list.

Even in these embodiments, however, it can be more convenient to create an address list that includes contact email addresses. Thus, message authority 1406 can be used to create such an address list, which can then be uploaded to communication device 1402 via network 1404, or the address list can simply be entered into communication device 1402, depending on the embodiment.

In embodiments where an address list is maintained by message authority 1406, a user of client device 1410 can initiate and send a data message to a communication device 1402 by accessing message authority 1406, e.g., via a web browser 244, and inquiring as to what communication device user's have added the user of client device 1410 to their address lists. If more than one user has added the user of client device 1410 to their address list, then a list of such users can be presented to the user of client device 1410. The user of client device 1410 can then be allowed to select one of the users from the list and generate a data message to be sent to the communication device 1402 associated with the selected user.

Accordingly, a user does not need to know anything more than their own address or identifier in order to send ad receive messages with one ore more communication devices 1402. In other words, the user of client device 1410 does not need to know the address or identifier associated with a particular user or client device 1402. Not does a user of client device 1410 need to know what type of device or communication program the user, or client device 1402 is using. In fact, the user of client device does not even need to know that a user of a communication device 1402 has added them to their address list, at least not ahead of time.

In one implementation, for example, the user of client device 1410 can select a user from the list of users presented by message authority 1406. The user of client device 1410 can then generate a data message intended for the user's communication device 1402. The user of client device 1410 can then send the data message, which can include an identifier that can be used to determine a reply path associated with client device 1410. The data message can then be forwarded to communication device 1402.

The data message can, as described above, actually be sent to message authority 1406, which can be configured to associate an intermediate reply path with the received message.

The user of communication device 1402 can then send a voice reply using a transmit action as described above in response to receiving the data message.

Figure 20:
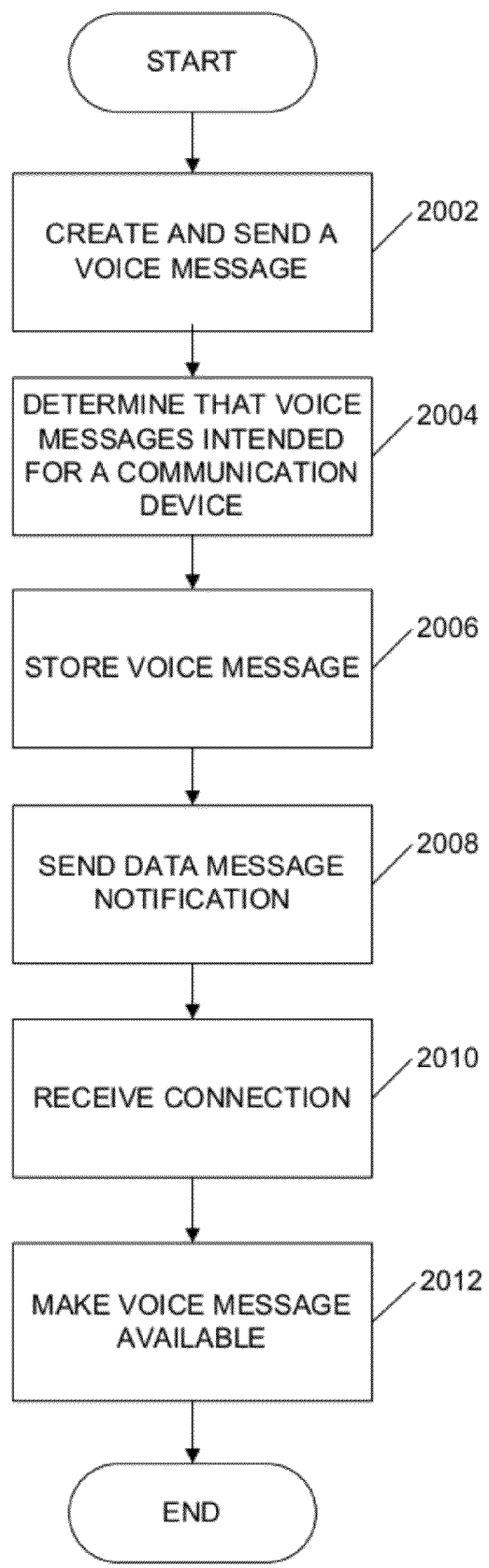
FIG. 20 is a flow chart illustrating an example method for communicating voice messages between communication devices.

FIG. 20 illustrated and example method for communication device-to-communication device voice messaging in accordance with the systems and methods described herein. First, in step 2002, a first communication device can initiate a voice message as described above. Thus, step 2002 can comprise the first communication device receiving a spoken reply and converting it into a voice message that is attached to a data message and transmitted to a message authority 1406. Alternatively, step 2002 can comprise the first communication device receiving a spoken reply and transmitting the spoken reply to a message authority 1406. Message authority 1406 can be configured to then convert the received spoken reply into a voice message.

In either case, the voice message can ultimately have an identifier that can be used to determine a communication device that is the intended recipient of the voice message. Message authority 1406 can be configured to determine, in step 2004, that the voice message is intended for another communication device and to store the voice message in step 2006. In step 2008, message authority 1496 can be configured to then send the intended communication device a data message informing the user of the intended communication device of the pending voice message.

In step 2010, the intended communication device can connect with message authority 1406 and request the voice message. In response, message authority can be configured to make the voice message available in step 2012.

Several things should be noted about the process of FIG. 20. First, the user can be configured to connect with message authority 1406 using the intended communication device and request the pending voice message using a transmit action as described above. Thus, the data message sent in step 2008 can include an identifier that can be used to identify a reply path that the intended communication device can use to retrieve the pending voice message. Second, making the voice message available in step 2012 can comprise message authority 1406 sending the voice message as voice signals through network 1404 to the intended communication device. Alternatively, the voice message can be sent to the intended communication device, e.g., attached to a data message, where it can be stored and played by the intended communication device.

Thus, including a message authority that is configured for greater capability can increase the functionality of the systems and methods described herein, e.g., by allowing a user of a client device to initiate communication by sending a data message to a communication device, such as a communication device 1402, or by enabling voice messaging between communication devices, such as communication devices 1402.

Figure 21:
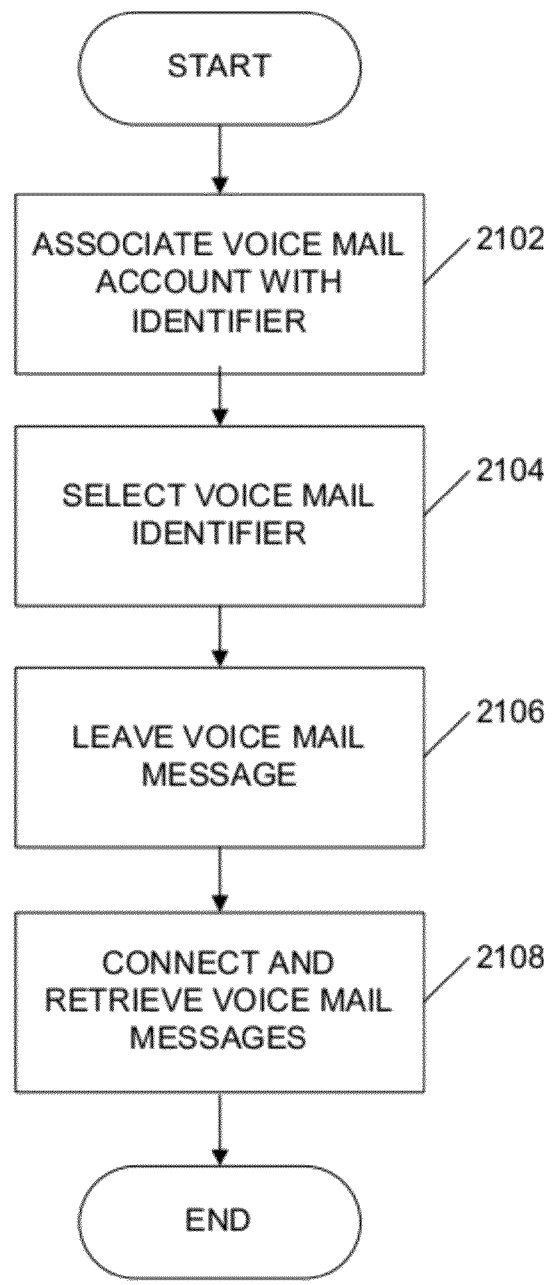
FIG. 21 is a diagram illustrating an example embodiment for directly populating a voice message in box with a voice message using a transmit action in accordance with one embodiment of the invention.

FIG. 21 is a flow chart illustrating an example method for directly populating a voice mail account using a transmit action in accordance with one embodiment of the systems and methods described herein. First, in step 2102, a contact's voice mail account can be associated with an identifier that can be used by a user of, e.g., a communication device 1402 to generate a voice mail message for the contact using a simple transmit action. For example, recall in the example implementation above, wherein a contact's email address is associated with a push-to-talk number. Thus, in step 2302, a communicating path that identifies a contact's voice mail account can be associated with a push-to-talk number instead, or in addition to, associating the contact's email address with a push-to-talk number.

If the user of a communication device 1402 wants to leave a voice mail message for the contact, they can simply select the number associated with the voice mail account in step 2104, initiate a simple transmit action in step 2106, and leave a voice mail message in step 2108. With conventional push-to-talk systems, a user can attempt to initiate a push-to-talk communication; however, if the intended recipient is not available, then the attempt fails. Thus, the process of FIG. 21 provides a means whereby push-to-talk systems, for example, can be used to leave voice mail messages. Further, the inefficiency of conventional voice mail can be avoided. In other words, there is no need to attempt a connection, wait to be transferred to voice mail, and then listen to, or navigate through, a menu system in order to leave a voice mail message.

In embodiments, where for example a message authority 1406 is used to host the voice mail account. The voice mail message can even be left as a voice message. Thus, the intended recipient can be sent a data message indicating that a pending message is waiting in step 2110. The user recipient can then retrieve the pending voice message using a single transmit action as described in relation to FIG. 20.

Figure 22:
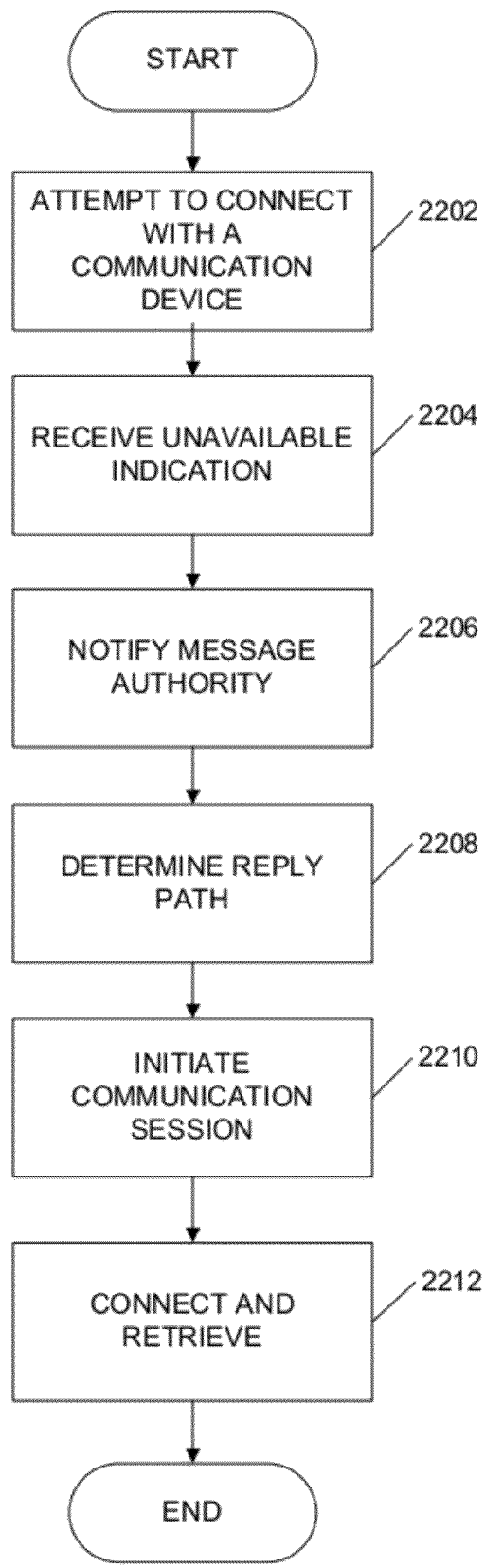
FIG. 22 is a diagram illustrating another example embodiment for directly populating a voice message in box with a voice message using a transmit action in accordance with one embodiment of the invention.

In one embodiment, a user of a communication device 1402 can attempt to first communicate directly with a user of a second communication device, but receives an indication that the user is not available. FIG. 22 is a flow chart illustrating such an embodiment in accordance with the systems and methods described herein. As with the process illustrated in FIG. 21, voice mail account reply path associated with a user of a communication device 1402 has been associated with an identifier that can be use to identify the reply path. First, in step 2202, a user attempts to connect with another communication device 1402 using, for example, a transmit action. Thus, the user can select an identifier associated with the other communication device 1402, or a user thereof. Initiating the transmit action can then cause the user's communication device to attempt to connect with the other communication device 1402 in step 2202.

In step 2204, the user can receive, via his communication device, an indication that the other user is not available. Additionally, message authority 1406 can be notified, in step 2206, that the connection between the two communication devices was not completed. Message authority 1406 can receive, as part of the notification, an identifier that can be used to identify the communication device attempting the connection an identifier that can be use to identify the communication device with which a connection is being attempted.

In step 2208, message authority 1406 can be configured to determine a reply path associated with a voice mail account that is associated with the user of the second communication device. In step 2210, message authority can be configured to then initiate a communication session with the communication device attempting the connection and send a voice signal to the first communication that asks the user if the user would like to leave a voice mail message for the other user. Thus, the user of the first communication device is now engaged in a communication session, e.g., a push-to-talk communication session, with message authority 1406; however, the identifier included with the voice signal can be the identifier associated with the voice mail account.

Thus, if the user initiates a response to the voice signal, e.g., using a transmit action, in step 2212, the user can be automatically connected with the voice mail account and can leave a voice mail message. As with the process of FIG. 21, if the voice mail message is saved as a voice message, then message authority can be configured to send a data message to the communication device associated with the voice mail account indicating that there is a pending voice message. The data massage can include an identifier that can enable the user of the communication device to simply initiate a transmit action to receive the voice message.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A method of communicating, comprising:
a message authority receiving a data message from a client device, the client device being associated with a reply path;
associating a reply path identifier associated with the reply path with an identifier associated with a mobile device and with one of a plurality of intermediate addresses associated with the message authority;
including or appending the intermediate address to the data message, and forwarding the data message to the mobile device;
receiving via one of a plurality of ports or receivers associated with the intermediate addresses a reply from the mobile device to the client device that includes the identifier that identifies the mobile device ; and
determining the reply path identifier associated with the client device by reference to a combination of the mobile device identifier and the intermediate address.

2. The method of claim 1, wherein the reply is a spoken reply, and the method further comprising the message authority converting the spoken reply into a voice message.

3. The method of claim 1, wherein the reply is a voice message.

4. The method of claim 2, further comprising the message authority generating a data message indicating that a voice message is pending and sending the data message to the client device via the reply path.

5. The method of claim 2, further comprising storing the voice message, attaching the stored voice message or a copy of the stored voice message to a data message, and sending the data message to the client device.

6. The method of claim 3, further comprising the message authority generating a data message indicating that a voice message is pending and sending the data message to the client device via the reply path.

7. The method of claim 3, further comprising storing the voice message, attaching the stored voice message or a copy of the stored voice message to a data message, and sending the data message to the client device.

8. The method of claim 1, further comprising generating and transmitting a data message to the client device via the reply path, and wherein generating and transmitting the data message comprises using an email client to generate and transmit the data message.

9. The method of claim 8, wherein the data message is an email message.

10. The method of claim 1, further comprising generating and transmitting a data message to the client device via the reply path, and wherein generating and transmitting the data message comprises using a web browser interfacing with a web-based application to generate and transmit the data message.

11. The method of claim 10, wherein the data message is an SMS message.

12. A message authority, comprising:
a first receiver configured to receive a data message from a client device, the client device being associated with a reply path;
a transmitter or output port configured to transmit data messages to one or more mobile devices;
a plurality of receivers or ports associated with a plurality of intermediate address associated with the message authority and configured to receive replies to data massages from the one or more mobile devices; and
a processor configured to associate a reply path identifier associated with the reply path with an identifier associated with a mobile device and with one of the plurality of intermediate addresses, include or append the intermediate address to the data message, forward the data massage to the transmitter or output port, and, when a reply is received via one of the plurality of receivers or ports, determine a reply path identifier associated with a client device by reference to a combination of the mobile device identifier and the intermediate address.

13. The message authority of claim 12, wherein the reply is a spoken reply, and wherein the processor is further configured to convert the spoken reply into a voice message.

14. The message authority of claim 12, wherein the reply is a voice message.

15. The message authority of claim 13, wherein the processor is further configured to generate a data message indicating that a voice message is pending and sending the data message to the client device via the reply path.

16. The message authority of claim 13, further comprising data storage, and wherein the processor is further configured to store the voice message, attach the stored voice message or a copy of the stored voice message to a data message, and send the data message to the client device.

17. The message authority of claim 14, wherein the processor is configured to generate a data message indicating that a voice message is pending and send the data message to the client device via the reply path.

18. The message authority of claim 14, further comprising data storage, and wherein the processor is further configured to store the voice message, attach the stored voice message or a copy of the stored voice message to a data message, and send the data message to the client device.

19. The message authority of claim 12, further comprising and email client and wherein the processor is further configured to generate and transmitting a data message to the client device via the reply path, and wherein generating and transmit the data message using the email client.

20. The message authority of claim 19, wherein the data message is an email message.

21. The message authority of claim 12, further comprising a web browser interfaced with a web-based application, and wherein the processor is further configured to generate and transmit a data message to the client device via the reply path using the web browser interfaced with a web-based application.

22. The message authority of claim 21, wherein the data message is an SMS message.

* * * * *